US010349438B2

(12) United States Patent
Yerramalli et al.

(10) Patent No.: US 10,349,438 B2
(45) Date of Patent: Jul. 9, 2019

(54) SCHEDULING ENHANCEMENTS FOR CONTENTION-BASED SHARED FREQUENCY SPECTRUM

(71) Applicant: QUALCOMM Incorporated, San Diego, CA (US)

(72) Inventors: Srinivas Yerramalli, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 15/061,953

(22) Filed: Mar. 4, 2016

(65) Prior Publication Data

US 2016/0278118 A1 Sep. 22, 2016

Related U.S. Application Data

(60) Provisional application No. 62/134,487, filed on Mar. 17, 2015.

(51) Int. Cl.
*H04W 72/14* (2009.01)
*H04W 72/04* (2009.01)
(Continued)

(52) U.S. Cl.
CPC ............. *H04W 72/14* (2013.01); *H04L 5/001* (2013.01); *H04W 24/08* (2013.01);
(Continued)

(58) Field of Classification Search
CPC .......... H04L 5/001; H04L 5/06; H04W 16/14; H04W 24/08; H04W 72/042; H04W 72/0453
(Continued)

(56) References Cited

U.S. PATENT DOCUMENTS

2011/0305161 A1* 12/2011 Ekpenyong ........... H04L 1/0031
370/252
2013/0022007 A1* 1/2013 Berggren ................ H04L 5/001
370/329
(Continued)

OTHER PUBLICATIONS

International Search Report and Written Opinion—PCT/US2016/021817—ISA/EPO—dated Jun. 13, 2016.

*Primary Examiner* — Mark H Rinehart
*Assistant Examiner* — Kokou R Detse
(74) *Attorney, Agent, or Firm* — Nerrie M. Zohn

(57) ABSTRACT

Channel availability is uncertain when employing an unlicensed carrier. In particular, it may be difficult to schedule grants in advance because of the uncertainty associated with future channels availability. Accordingly, scheduling UL and/or DL grants exclusively using self-scheduling or exclusively using cross-carrier scheduling for utilizing an unlicensed carrier may result in wasted communication opportunities. Aspects disclosed herein whereby an eNB may use licensed and unlicensed carriers to communicate downlink grants and uplink grants for an unlicensed carrier to a UE. In one aspect, the eNB may use an unlicensed carrier to communicate downlink grants for downlink communication on the unlicensed carrier, and may use a licensed carrier to communicate uplink grants for uplink communication on the unlicensed carrier.

92 Claims, 17 Drawing Sheets

(51) Int. Cl.
*H04W 72/12* (2009.01)
*H04W 24/08* (2009.01)
*H04L 5/00* (2006.01)
H04L 5/06 (2006.01)
H04W 16/14 (2009.01)

(52) U.S. Cl.
CPC ..... *H04W 72/042* (2013.01); *H04W 72/0453* (2013.01); *H04W 72/1268* (2013.01); *H04W 72/1273* (2013.01); *H04W 72/1294* (2013.01); *H04L 5/06* (2013.01); *H04W 16/14* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0028205 A1* | 1/2013 | Damnjanovic | H04L 5/001 370/329 |
| 2013/0322378 A1* | 12/2013 | Guan | H04W 72/1289 370/329 |
| 2014/0161002 A1* | 6/2014 | Gauvreau | H04W 16/24 370/280 |
| 2014/0348091 A1* | 11/2014 | Seo | H04L 5/003 370/329 |

\* cited by examiner

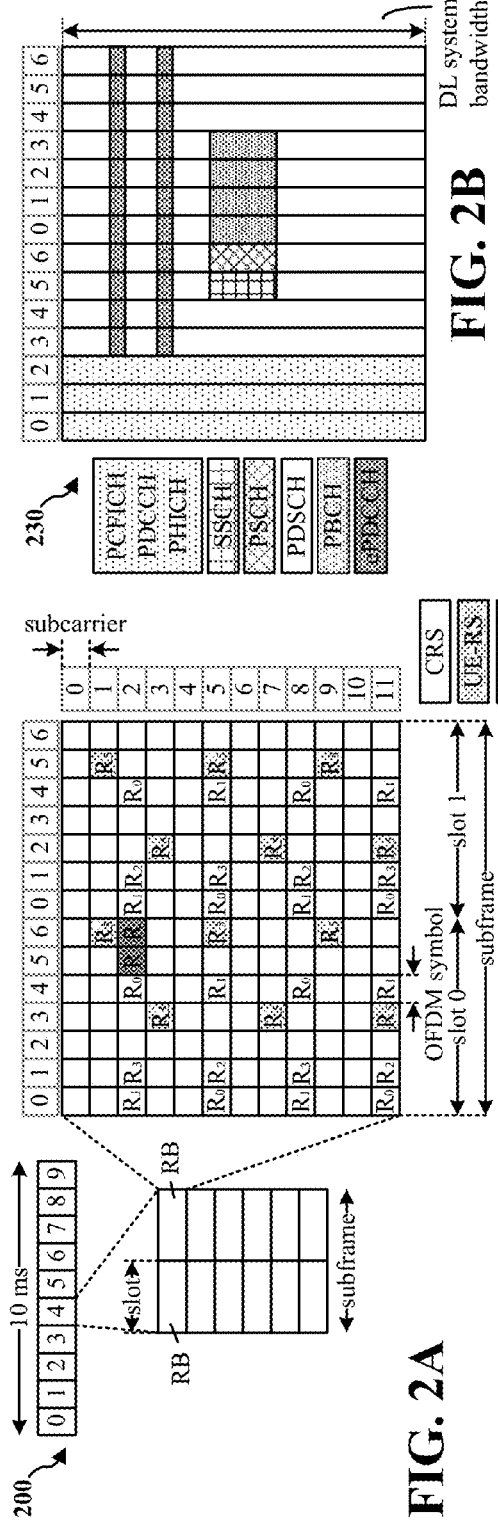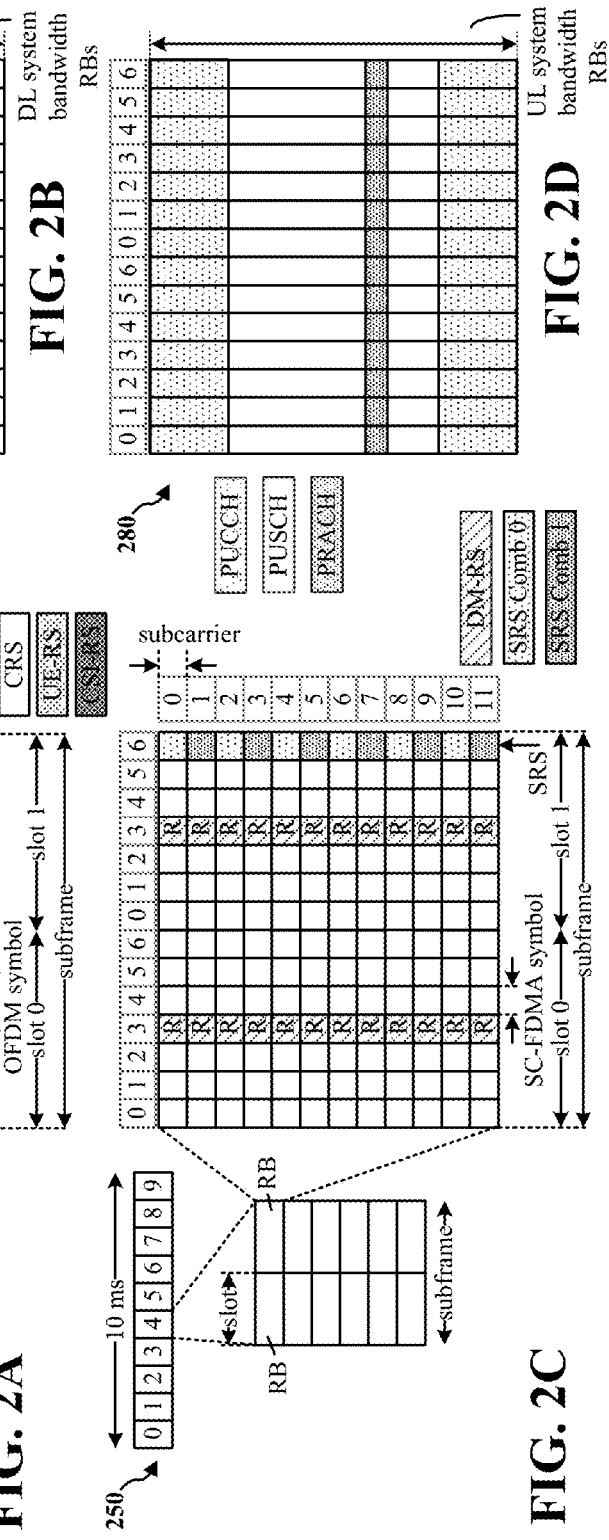

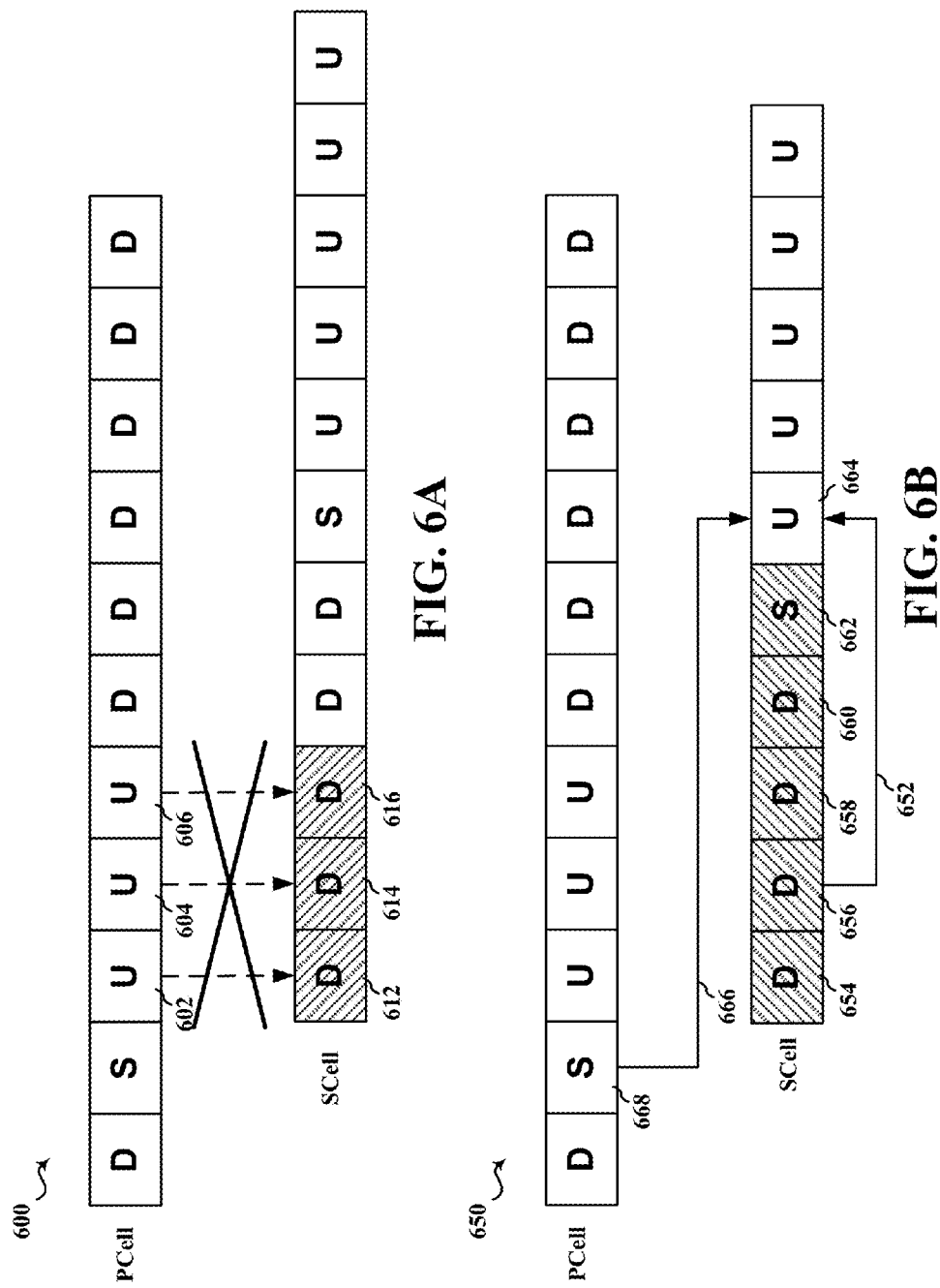

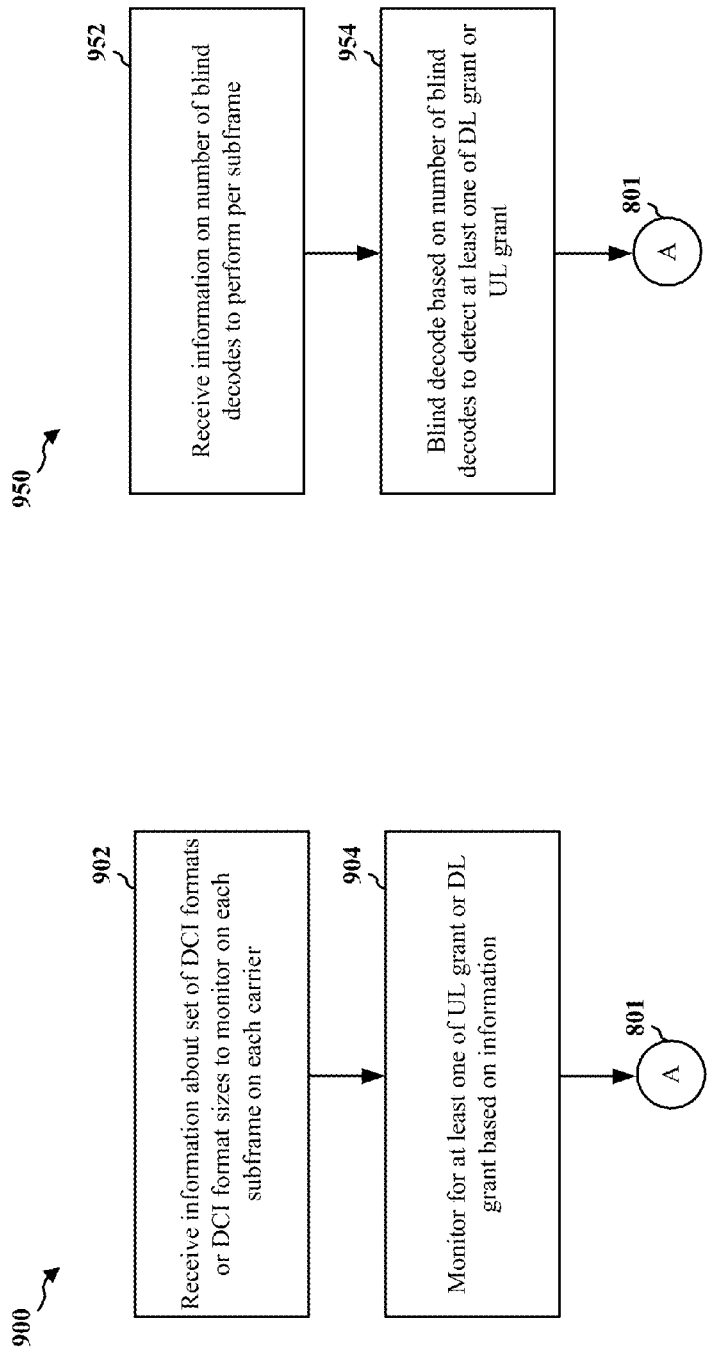

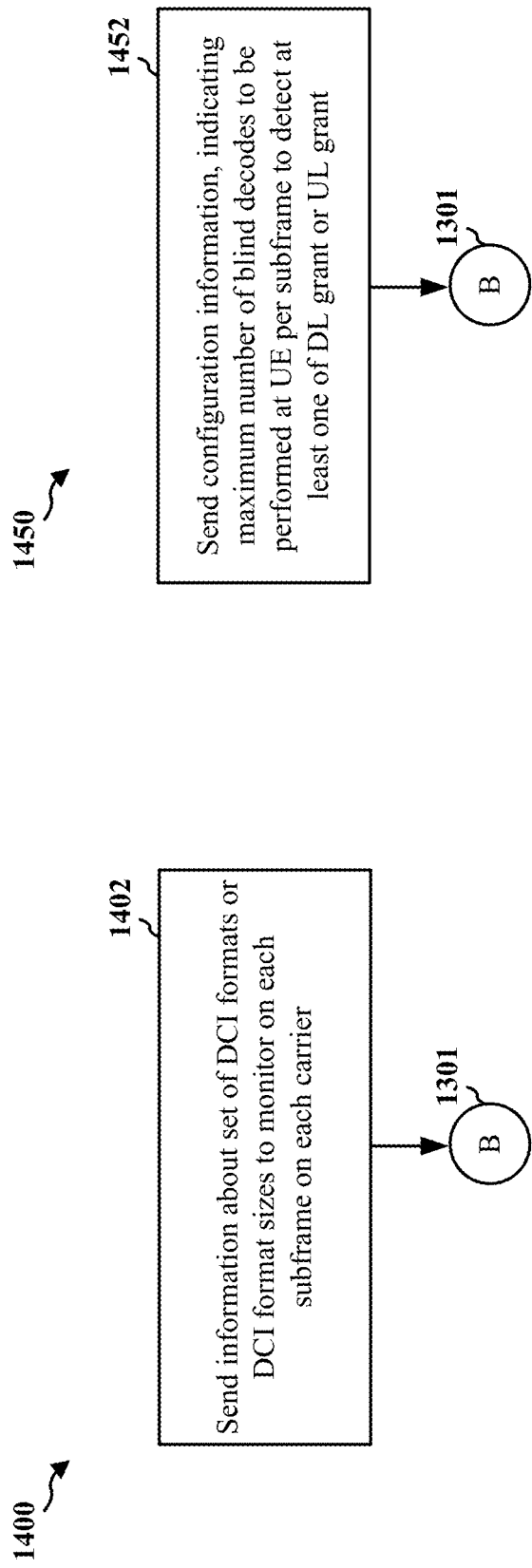

SCHEDULING ENHANCEMENTS FOR CONTENTION-BASED SHARED FREQUENCY SPECTRUM

CROSS-REFERENCE TO RELATED APPLICATION(S)

This application claims the benefit of U.S. Provisional Application Ser. No. 62/134,487 entitled "Scheduling enhancements for LTE-U" and filed on Mar. 17, 2015, which is expressly incorporated by reference herein in its entirety.

BACKGROUND

Field

The present disclosure relates generally to communication systems, and more particularly, to mitigation of inter-base station resynchronization loss in long term evolution (LTE)/LTE-Advanced (LTE-A) networks operating in contention-based shared frequency spectrum.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Some modes of communication may enable communications between a base station and a UE over a contention-based shared radio frequency spectrum band, or over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable. When utilizing an unlicensed carrier, channel availability may be uncertain. Thus, several difficulties may arise due to the uncertainty of channel availability when an unlicensed carrier is used.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Channel availability is uncertain when employing an unlicensed carrier. In particular, scheduling grants in advance may be difficult because of the uncertainty associated with future channels availability. Accordingly, scheduling uplink (UL) and/or downlink (DL) grants exclusively using self-scheduling or exclusively using cross-carrier scheduling for utilizing an unlicensed carrier may result in wasted communication opportunities. Aspects disclosed herein whereby an eNodeB (eNB) may use licensed and unlicensed carriers to communicate downlink grants and uplink grants for an unlicensed carrier to a UE.

In one aspect of the present disclosure, a method of wireless communication by a user equipment (UE) includes receiving a DL grant for a secondary carrier and an UL grant for the secondary carrier. In an aspect, the DL grant is received on the secondary carrier and the UL grant is received on a primary carrier. The method further includes receiving DL data on the secondary carrier after receiving the DL grant on the secondary carrier. The method further includes transmitting UL data on the secondary carrier after receiving the UL grant on the primary carrier.

In an aspect, a UE includes means for receiving a downlink (DL) grant for a secondary carrier and an uplink (UL) grant for the secondary carrier, where the DL grant is received on the secondary carrier and the UL grant is received on a primary carrier. The UE further includes means for receiving DL data on the secondary carrier after receiving the DL grant on the secondary carrier. The UE further includes means for transmitting UL data on the secondary carrier after receiving the UL grant on the primary carrier.

In an aspect, a UE includes a memory and at least one processor coupled to the memory. The at least one processor is configured to: receive a downlink (DL) grant for a secondary carrier and an uplink (UL) grant for the secondary carrier, where the DL grant is received on the secondary carrier and the UL grant is received on a primary carrier, receive DL data on the secondary carrier after receiving the DL grant on the secondary carrier, and transmit UL data on the secondary carrier after receiving the UL grant on the primary carrier.

In an aspect, a computer-readable medium stores computer executable code for wireless communication by a UE. The computer-readable medium includes code to: receive a downlink (DL) grant for a secondary carrier and an uplink (UL) grant for the secondary carrier, where the DL grant is received on the secondary carrier and the UL grant is received on a primary carrier, receive DL data on the secondary carrier after receiving the DL grant on the secondary carrier, and transmit UL data on the secondary carrier after receiving the UL grant on the primary carrier. In an aspect, the computer-readable medium may be a non-transitory computer-readable medium.

In another aspect of the present disclosure, a method of wireless communication by a base station includes sending a DL grant for a secondary carrier and a UL grant for the secondary carrier. In an aspect, the DL grant is transmitted on the secondary carrier and the UL grant is transmitted on a primary carrier. The method further includes sending DL data on the secondary carrier after sending the DL grant on the secondary carrier. The method further includes receiving UL data on the secondary carrier after sending the UL grant on the primary carrier.

In an aspect, a UE includes means for sending a DL grant for a secondary carrier and a UL grant for the secondary carrier, where the DL grant is transmitted on the secondary carrier and the UL grant is transmitted on a primary carrier. The UE further includes means for sending DL data on the secondary carrier after sending the DL grant on the secondary carrier. The UE further includes means for receiving UL data on the secondary carrier after sending the UL grant on the primary carrier.

In an aspect, a UE includes a memory and at least one processor coupled to the memory. The at least one processor is configured to: send a DL grant for a secondary carrier and a UL grant for the secondary carrier, where the DL grant is transmitted on the secondary carrier and the UL grant is transmitted on a primary carrier, send DL data on the secondary carrier after sending the DL grant on the secondary carrier, and receive UL data on the secondary carrier after sending the UL grant on the primary carrier.

In an aspect, a computer-readable medium stores computer executable code for wireless communication by a UE. The computer-readable medium includes code to: send a DL grant for a secondary carrier and a UL grant for the secondary carrier, where the DL grant is transmitted on the secondary carrier and the UL grant is transmitted on a primary carrier, send DL data on the secondary carrier after sending the DL grant on the secondary carrier, and receive UL data on the secondary carrier after sending the UL grant on the primary carrier. In an aspect, the computer-readable medium may be a non-transitory computer-readable medium.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 6A and FIG. 6B are example diagrams illustrating uses of a primary serving cell served by a PCC and a secondary serving cell served by an SCC for uplink communication.

FIG. 9A is a flow chart of a method of wireless communication expanding from the flow chart of FIG. 11, according to an aspect of the disclosure.

FIG. 9B is a flow chart of a method of wireless communication expanding from the flow chart of FIG. 11, according to an aspect of the disclosure.

FIG. 14A is a flow chart of a method of wireless communication expanding from the flow chart of FIG. 16, according to an aspect of the disclosure.

FIG. 14B is a flow chart of a method of wireless communication expanding from the flow chart of FIG. 16, according to an aspect of the disclosure.

DETAILED DESCRIPTION

Figure 1:
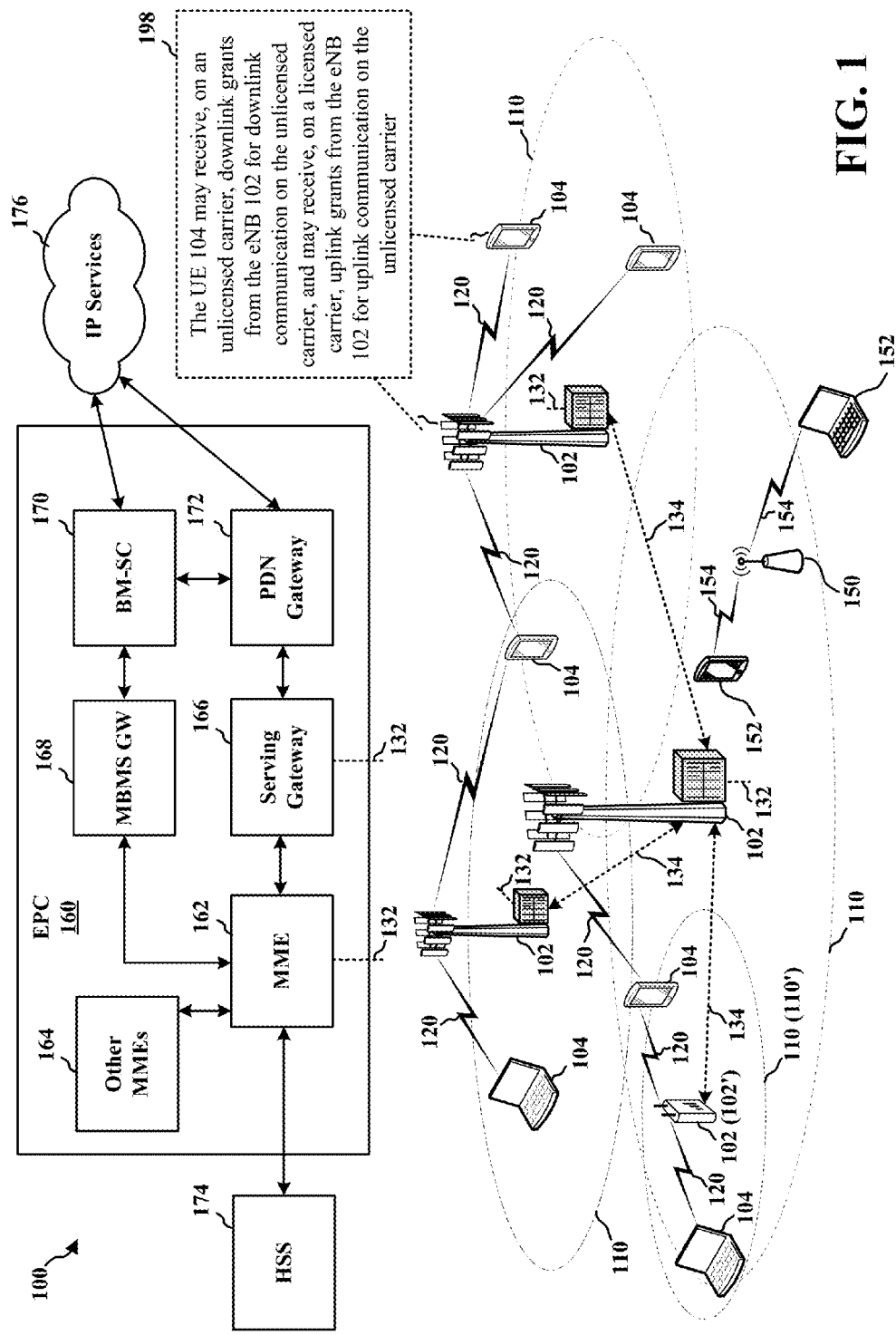
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may receive, on an unlicensed carrier, downlink grants from the eNB 102 for downlink communication on the unlicensed carrier, and may receive, on a licensed carrier, uplink grants from the eNB 102 for uplink communication on the unlicensed carrier (198).

FIG. 2A is a diagram 200 illustrating an example of a DL frame structure in LTE.

FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2 3, of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
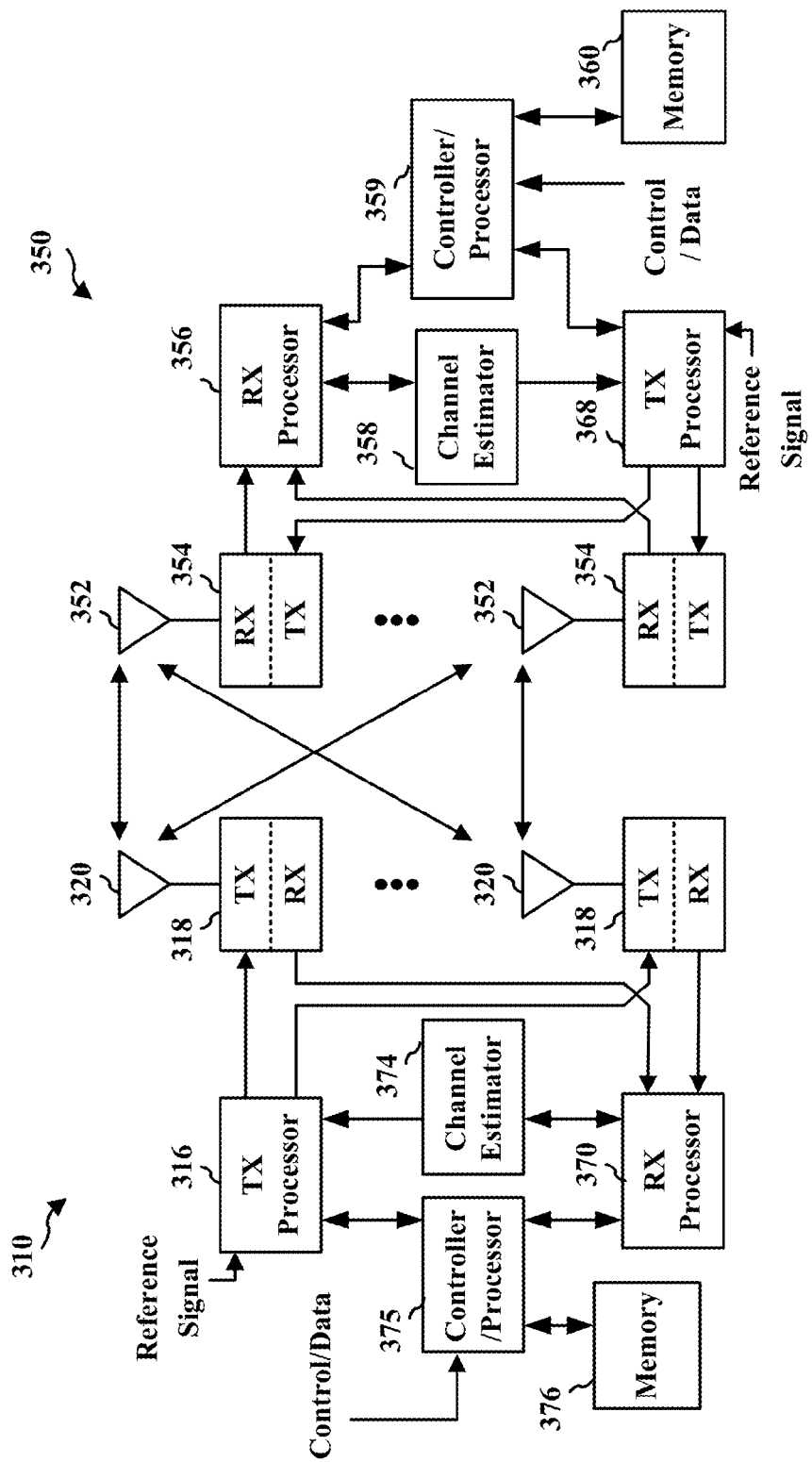
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through the receiver's respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through the receiver's respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
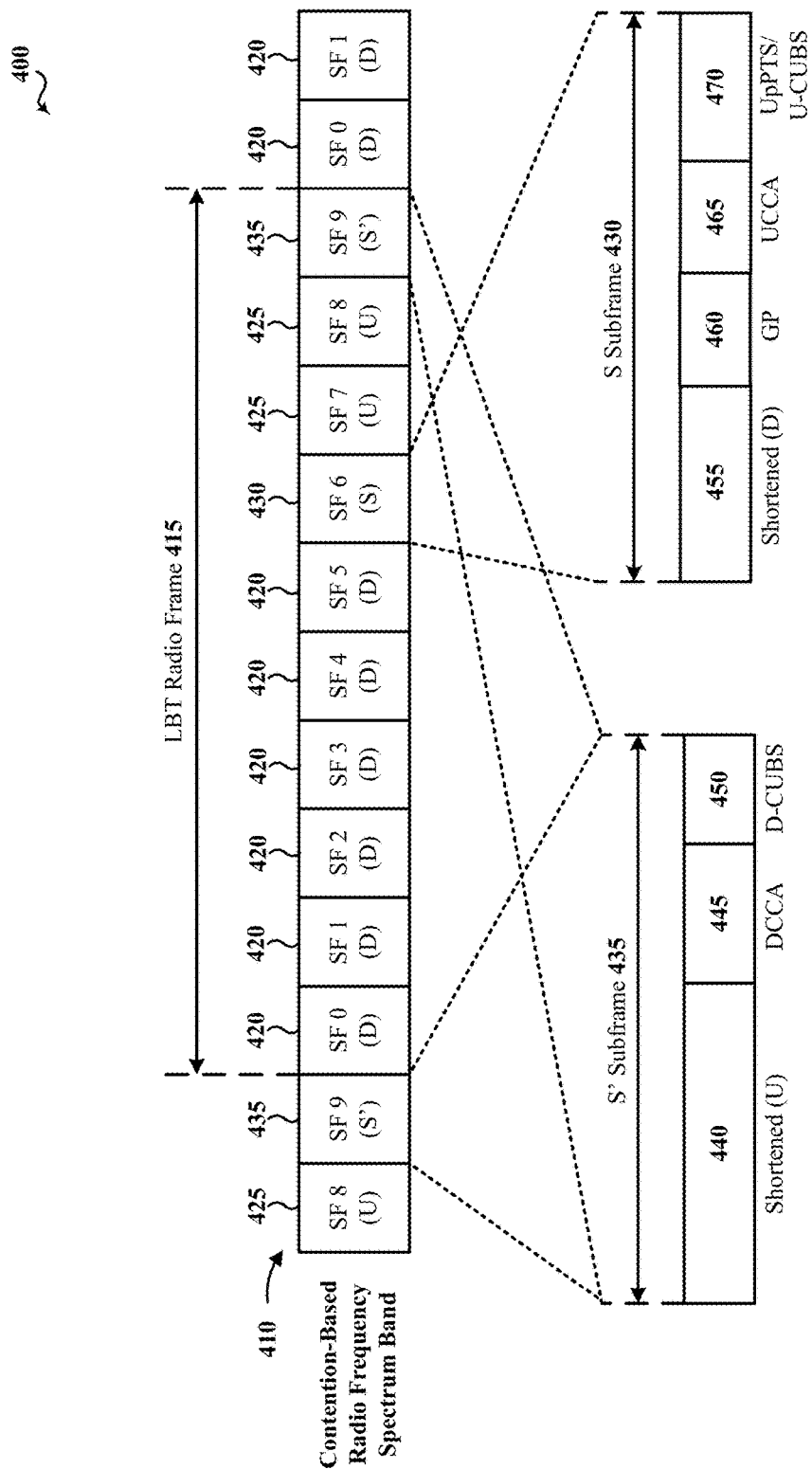
FIG. 4 is an illustration of an example of a wireless communication over an unlicensed radio frequency spectrum band, in accordance with various aspects of the present disclosure.

FIG. 4 is an illustration of an example 400 of a wireless communication 410 over an unlicensed radio frequency spectrum band, in accordance with various aspects of the present disclosure. In some examples, a listen before talk (LBT) radio frame 415 may have a duration of ten milliseconds and include a number of downlink (D) subframes 420, a number of uplink (U) subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420 and, in some examples, a transition between LBT radio frames.

During the S' subframe 435, a downlink clear channel assessment (CCA) procedure 445 may be performed by one or more base stations, such as one or more of the base stations 102 described with reference to FIG. 1, to reserve, for a period of time, a channel of the contention-based shared radio frequency spectrum band over which the wireless communication 410 occurs. Following a successful downlink CCA procedure 445 by a base station, the base station may transmit a preamble, such as a channel usage beacon signal (CUBS) (e.g., a downlink CUBS (D-CUBS 450)) to provide an indication to other base stations or apparatuses (e.g., UEs, WiFi access points, etc.) that the base station has reserved the channel. In some examples, a D-CUBS 450 may be transmitted using a plurality of interleaved resource blocks. Transmitting a D-CUBS 450 in this manner may enable the D-CUBS 450 to occupy at least a certain percentage of the available frequency bandwidth of the contention-based shared radio frequency spectrum band and satisfy one or more regulatory requirements (e.g., a requirement that transmissions over an unlicensed radio frequency spectrum band occupy at least 80% of the available frequency bandwidth). The D-CUBS 450 may in some examples take a form similar to that of an LTE/LTE-A cell-specific reference signal (CRS) or a channel state information reference signal (CSI-RS). When the downlink CCA procedure 445 fails, the D-CUBS 450 may not be transmitted.

The S' subframe 435 may include a plurality of OFDM symbol periods (e.g., 14 OFDM symbol periods). A first portion of the S' subframe 435 may be used by a number of UEs as a shortened uplink (U) period 440. A second portion of the S' subframe 435 may be used for the downlink CCA procedure 445. A third portion of the S' subframe 435 may be used by one or more base stations that successfully contend for access to the channel of the contention-based shared radio frequency spectrum band to transmit the D-CUBS 450.

During the S subframe 430, an uplink CCA procedure 465 may be performed by one or more UEs, such as one or more of the UEs 104 described above with reference to FIG. 1, to reserve, for a period of time, the channel over which the wireless communication 410 occurs. Following a successful uplink CCA procedure 465 by a UE, the UE may transmit a preamble, such as an uplink CUBS (U-CUBS 470) to provide an indication to other UEs or apparatuses (e.g., base stations, WiFi access points, etc.) that the UE has reserved the channel. In some examples, a U-CUBS 470 may be transmitted using a plurality of interleaved resource blocks. Transmitting a U-CUBS 470 in this manner may enable the U-CUBS 470 to occupy at least a certain percentage of the available frequency bandwidth of the contention-based radio frequency spectrum band and satisfy one or more regulatory requirements (e.g., the requirement that transmissions over the contention-based radio frequency spectrum band occupy at least 80% of the available frequency bandwidth). The U-CUBS 470 may in some examples take a form similar to that of an LTE/LTE-A CRS or CSI-RS. When the uplink CCA procedure 465 fails, the U-CUBS 470 may not be transmitted.

The S subframe 430 may include a plurality of OFDM symbol periods (e.g., 14 OFDM symbol periods). A first portion of the S subframe 430 may be used by a number of base stations as a shortened downlink (D) period 455. A second portion of the S subframe 430 may be used as a guard period (GP) 460. A third portion of the S subframe 430 may be used for the uplink CCA procedure 465. A fourth portion of the S subframe 430 may be used by one or more UEs that successfully contend for access to the channel of the contention-based radio frequency spectrum band as an uplink pilot time slot (UpPTS) or to transmit the U-CUBS 470.

In some examples, the downlink CCA procedure 445 or the uplink CCA procedure 465 may include the performance of a single CCA procedure. In other examples, the downlink CCA procedure 445 or the uplink CCA procedure 465 may include the performance of an extended CCA procedure. The extended CCA procedure may include a random number of CCA procedures, and in some examples may include a plurality of CCA procedures.

As indicated above, FIG. 4 is provided as an example. Other examples are possible and may differ from what was described in connection with FIG. 4.

In LTE networks with a licensed carrier and one or more unlicensed carriers, DL grants and UL grants may generally be scheduled using a self-scheduling mode and/or a cross-carrier scheduling mode. In the self-scheduling mode, the UE utilizes the same carrier to receive a grant for data communication and to schedule a resource for data communication based on the grant. In particular, the UE is configured to receive a DL grant and to receive DL data based on the DL grant on the same carrier, and the UE is configured to receive a UL grant and to transmit UL data based on the UL grant on the same carrier. Thus, in the self-scheduling mode, reception of a DL grant and an UL grant, and communication of DL data and UL data is performed on the same carrier. In the cross-carrier scheduling mode, the UE may utilize one carrier to receive a grant and utilize another carrier to schedule a resource for data communication based on the grant. In particular, the UE may be configured to receive a DL grant and a UL grant on one carrier (e.g., a first carrier), and may be configured to receive DL data on a different carrier (e.g., a second carrier) and to transmit UL data on a different carrier (e.g., the second carrier or a third carrier). Thus, in the cross-carrier scheduling mode, reception of a DL grant and communication of DL data are performed on different carriers, and reception of a UL grant and communication of UL data are performed on different carriers.

Figure 5B:
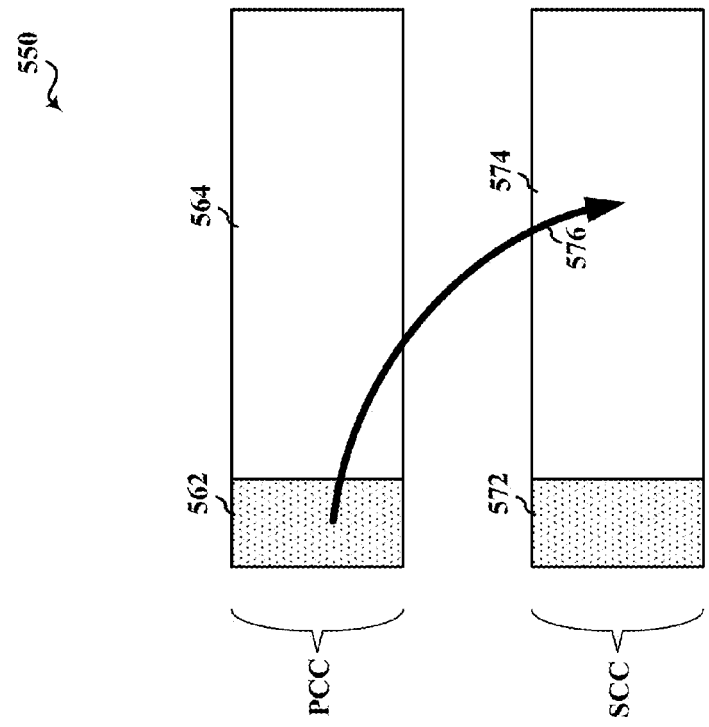
FIG. 5B illustrates an example diagram of a cross-carrier scheduling mode.
Figure 5A:
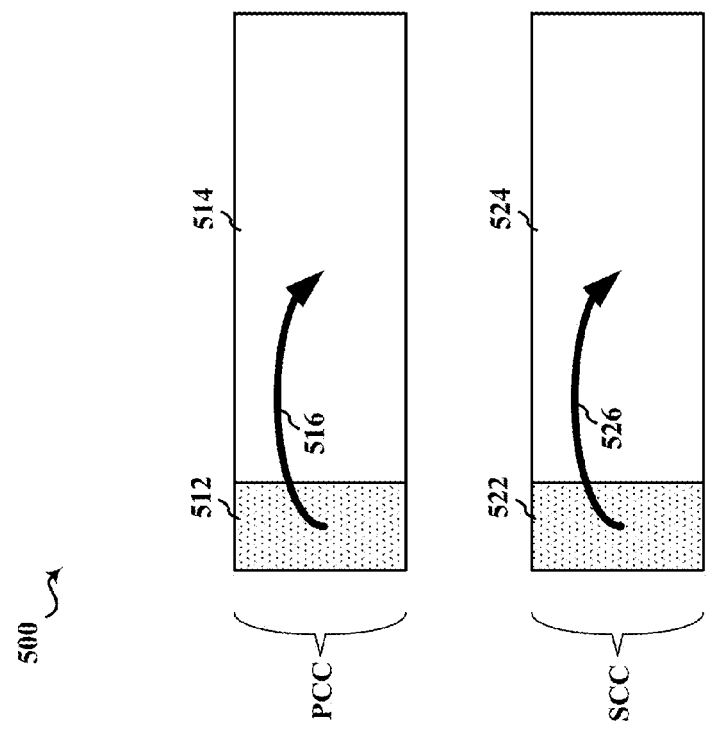
FIG. 5A illustrates an example diagram of a self-scheduling mode.

FIG. 5A illustrates an example diagram 500 of a self-scheduling mode. On the primary component carrier (PCC) of the diagram 500, the UE receives a grant (e.g., a UL grant or a DL grant) in the control region 512 of the PCC and communicates data (e.g., UL data based on the UL grant or DL data based on the DL grant) in the data region 514 of the PCC, as indicated by the arrow 516. On the secondary component carrier (SCC) of the diagram 500, the UE receives a grant (e.g., a UL grant or a DL grant) in the control region 522 of the SCC and communicates data (e.g., UL data based on the UL grant or DL data based on the DL grant) in the data region 524 of the SCC, as indicated by the arrow 526.

FIG. 5B illustrates an example diagram 550 of a cross-carrier scheduling mode. On the PCC of the diagram 550, the UE receives a grant (e.g., a UL grant or a DL grant) in the control region 562 of the PCC. After receiving the grant in the control region 562 of PCC, the UE may communicate data (e.g., UL data based on the UL grant or DL data based on the DL grant) in the data region 574 of the SCC, thereby performing cross-carrier scheduling of the data communication between the PCC and SCC as indicated by the arrow 576. The SCC may include a control region 572 or may not include any control region. Optionally, the UE may be additionally configured to communicate data in the data region 564 of the PCC based on the received grant.

As discussed supra, CCs may be aggregated together via carrier aggregation and may be configured with either an FDD configuration or with a TDD configuration. For a cross-carrier scheduling mode on an SCC using an FDD PCC, if a DL grant is received in subframe n of the PCC, the DL data is received in subframe n of the SCC based on the DL grant. In addition, for a cross-carrier scheduling mode on an SCC using a FDD PCC, if a UL grant is received in subframe n–4 of the PCC, the UL data is received in subframe n of the SCC based on the UL grant. For a cross-carrier scheduling mode on an SCC using TDD PCC, a DL grant for receiving DL data on subframe n of the SCC may be scheduled on the PCC when a DL subframe is present in the PCC. For a cross-carrier scheduling mode on an SCC using TDD PCC, the UL grant for transmitting UL data on subframe n of the SCC may be received in subframe n–4, n–5, n–6, etc., depending on the TDD configuration of the PCC.

It is noted that channel availability may not be certain when utilizing an unlicensed carrier. In particular, scheduling grants in advance may be difficult because of difficulty when determining available channels. At least for these reasons, scheduling UL and/or DL grants in advance may not be feasible when utilizing an unlicensed carrier or may result in wastage of RBs and/or underutilization of RBs even when the UL and/or DL grants are scheduled in advance. Therefore, a new scheduling scheme to improve utilization of an unlicensed carrier may be desired.

FIG. 6A and FIG. 6B are example diagrams illustrating uses of a primary serving cell served by a PCC and a secondary serving cell served by an SCC for uplink communication. The PCC may be a component carrier operating in a licensed spectrum, and the SCC may be a carrier operating on unlicensed spectrum. However, in other implementations either may be licensed or unlicensed.

FIG. 6A is an example diagram 600 illustrating a mismatch that may result from DL cross-carrier scheduling, using the primary serving cell (the PCell) to communicate DL grants for a secondary serving cell (the SCell). The PCell is served by the PCC, and the SCell is served by the SCC. The Example diagram 600 illustrates a situation where the TDD configuration of the primary serving cell prevents the eNB from scheduling a DL grant for the SCC of the SCell. Specifically, in this example, since timing of UL subframes (e.g., UL subframes 602, 604, and 606) in the PCell overlaps with timing of DL subframes (e.g., DL subframes 612, 614, and 616) in the SCell, the eNB cannot provide DL grants in UL subframes 602, 604, and 606 for DL communication on DL subframes 612, 614, and 616, respectively. Since the UE cannot receive a DL grant on the UL subframes (602, 604, and 606) in the PCell, the UE cannot perform data communication on DL subframes 612, 614, and 616 and thus misses a data communication opportunity.

FIG. 6B is an example diagram 650 illustrating both UL cross-carrier scheduling 666 and UL self-scheduling 652.

When using self-scheduling (e.g., UL self-scheduling 652), channel availability may be determined by performing a two level checking procedure. In a first level of the checking procedure, the eNB checks for an available channel for transmission of a grant, and transmits the grant using the available channel. In a second level of the checking procedure, after the UE receives the grant, the UE checks for an available channel for data communication based on the grant. When using UL self-scheduling 652, if none of the subframes 654, 656, 658, 660, and 662 are available for the UE to receive a UL grant from the eNB, then the UE will be unable to perform UL communication on the UL subframe 664 due to lack of a UL grant. Furthermore, since the UE may need to receive the UL grant at least 4 subframes before UL communication, lack of an available channel in subframes 654 and 656 may cause the UE to miss a UL transmission opportunity in the UL subframe 664.

An alternative to UL self-scheduling 652 is to use UL cross-carrier scheduling 666. In UL cross-carrier scheduling 666, the UE receives an UL grant from the PCell, and transmits UL data to the SCell based on the UL grant. When using cross-carrier scheduling 666, the UE receives an UL grant in a subframe 668 of the PCell. Because the PCC of the PCell is a licensed carrier, the eNB does not need to check for a channel that is available for transmission of the UL grant. Therefore, in the cross-carrier scheduling, the first level of the checking procedure for an available channel may not be necessary. After receiving the UL grant in the subframe 668 from the PCell, the UE may transmit UL data in the UL subframe 664 to the SCell.

According to the disclosure, the UE and eNB may use a combination of self-scheduling and cross-carrier scheduling. DL cross-carrier scheduling may experience the following problem when a licensed carrier and unlicensed carrier are used. When the eNB (e.g., during cross-carrier scheduling) transmits a DL grant on a licensed carrier (e.g., the PCC), the eNB does not know whether a channel is available on an unlicensed carrier (e.g., the SCC) for DL communication on the SCC. If no channel is available for DL communication on the SCC when the DL grant is received by the UE, the UE may not be able to receive the DL communication. Thus, the eNB keeps scheduling a DL grant and the UE repeatedly attempts to receive DL communication until successful DL communication is performed on an available channel, which may not be desirable for the UE. Hence, for the DL communication, self-scheduling may be more advantageous than cross-carrier scheduling. On the other hand, for UL communication, UL cross-carrier scheduling may not experience the same problem as the DL cross-carrier scheduling. In particular, the eNB sends a UL grant some time before receiving a UL communication (e.g., 4 msec before receiving the UL communication), and thus the eNB may have sufficient time to allocate an available channel for the UL communication. For example, for the UL cross-carrier scheduling, because the eNB has sufficient time to allocate an available channel for the UL communication after sending the UL grant, the UE may not need to repeatedly attempt to transmit UL communication until successful UL communication on an available channel. The UE receives the UL grant on the licensed carrier and performs the UL communication on an unlicensed carrier. Thus, for example, the eNB may not need to check for channel availability when sending the UL grant on the licensed carrier.

Therefore, according to an aspect of the disclosure, a self-scheduling mode may be utilized for DL grants and a cross-carrier scheduling mode may be utilized for UL grants. In particular, according to the aspect, for the DL communication utilizing the self-scheduling mode, the UE may receive a DL grant and subsequently receive DL data on the same carrier. For UL communication utilizing the cross-carrier scheduling mode, the UE may receive a UL grant on one carrier and may transmit UL data to the eNB on another carrier. For example, the UE may be configured to receive, on a secondary carrier, a DL grant for the secondary carrier, and to receive DL data on the secondary carrier based on the DL grant, according to the self-scheduling mode. Further, according to the cross-carrier scheduling mode, the UE may be configured to receive, on a primary carrier, a UL grant for the secondary carrier and transmit UL data on the secondary carrier based on the UL grant. For example, the primary carrier may be a licensed carrier (e.g., a PCC) and the secondary carrier may be an unlicensed carrier (e.g., an SCC).

Figure 7:
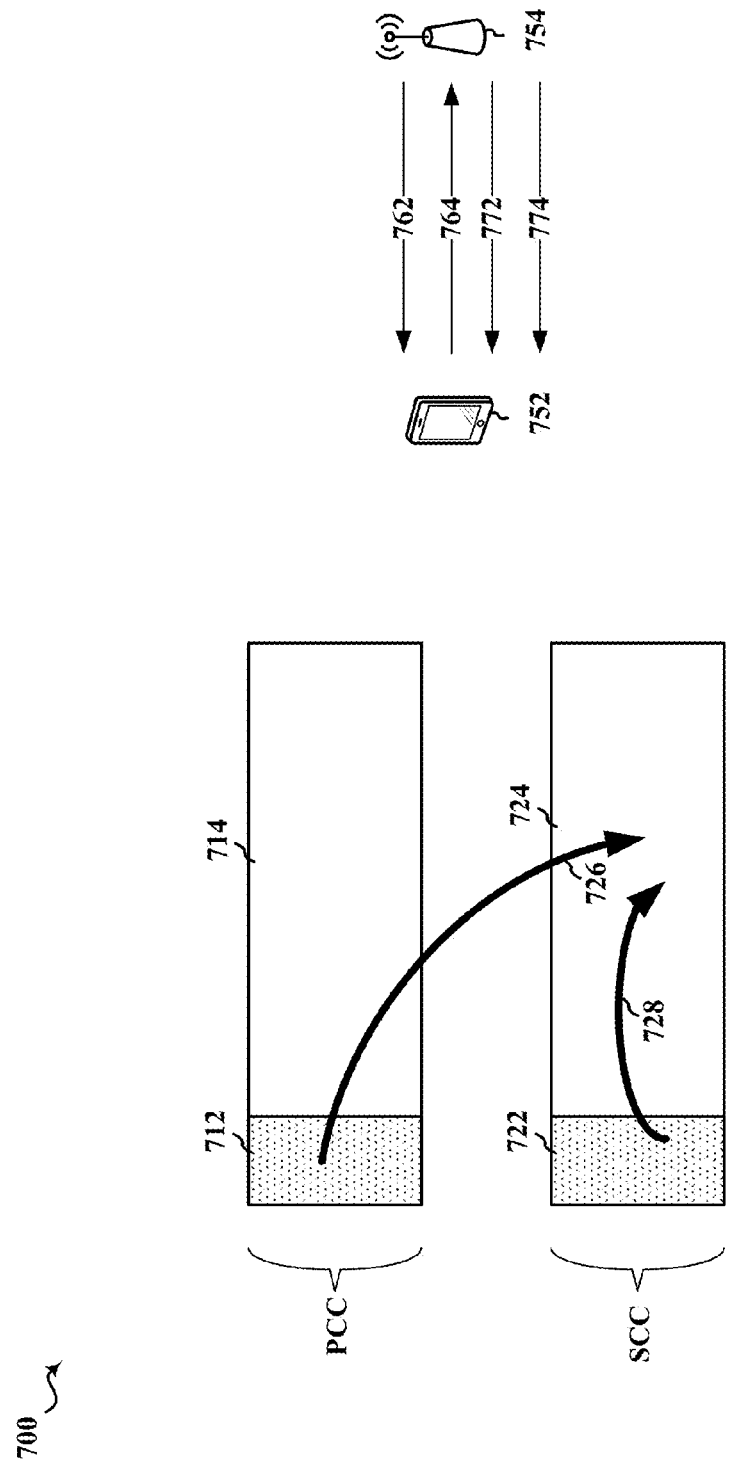
FIG. 7 is an example diagram illustrating self-scheduling and cross-carrier scheduling according to an aspect of the disclosure.

FIG. 7 is an example diagram 700 illustrating self-scheduling and cross-carrier scheduling according to an aspect of the disclosure. A PCC in FIG. 7 has a control region 712 and a data region 714, and an SCC in FIG. 7 has a control region 722 and a data region 724. A UE (e.g., UE 752) may utilize the cross-carrier scheduling mode for the UL communication. In particular, the UE 752 may receive at 762, from the eNB 754, a UL grant in the control region 712 of the PCC, where the UL grant is for UL communication on the SCC. After receiving the UL grant on the PCC, the UE 752 may transmit at 764 to the eNB 754, based on the UL grant, UL data in the data region 724 of the SCC, as indicated by the arrow 726. The UE 752 may utilize the self-scheduling mode for the DL communication. In particular, the UE 752 may receive at 772, from the eNB 754, a DL grant in the control region 722 of the SCC, where the DL grant is for DL communication on the SCC. After receiving the DL grant on the SCC, the UE 752 may receive at 774, from the eNB 754, DL data in the data region 724 of the SCC based on the DL grant, as indicated by the arrow 728.

Aspects of the disclosure may provide several advantages as follows. Firstly, when the eNB self-schedules a DL communication on a secondary carrier that is an unlicensed carrier, the UE will be able to receive the DL grant on the secondary carrier as long as the eNB has access to a channel for communicating the DL grant to the UE. If the eNB does not have access to a channel, the eNB may not schedule the DL grant. Because the eNB may determine to schedule the DL grant based on whether the eNB already has access to a channel, the eNB does not attempt to utilize the secondary carrier for the DL grant unless the eNB determines whether the eNB has access to a channel for DL communication, which reduces instances of invalid grants being used at the UE. Further, utilizing the secondary carrier to receive the DL grant may save resources on the primary carrier that is a licensed carrier and may reduce grant overload on the primary carrier. Secondly, because the eNB transmits the UL grant on the primary carrier that is a licensed carrier, the eNB may not need to check for channel availability. In other words, contrary to the transmission of the grant on an unlicensed carrier, the eNB, when scheduling a UL grant for transmission on a licensed carrier, does not need to check for channel availability. Thus, transmission of the UL data does not depend on the channel availability for receiving the UL grant.

In an aspect of the disclosure, UE complexity may be reduced using an approach by the disclosure. The UE complexity may increase as a number of UE searches for downlink control information (DCI) format sizes (format sizes of DCI messages) increases. Thus, according to the aspect, the UE complexity may be reduced by reducing the number of UE searches. If both a DL grant and a UL grant are communicated on the same carrier, the UE may search for a format size of a DCI message to obtain the UL grant and/or the DL grant on the same carrier. If a DL grant is communicated on a first carrier and a UL grant is communicated on a second carrier different from the first carrier, the UE may search for a format size of a DCI message for the DL grant on the first carrier and additionally search for a format size of a DCI message for the UL grant on the second carrier. For example, when scheduling on the PCC, a DL grant and a UL grant may correspond to the same format size of a DCI message, and thus the UE may find the DL grant and the UL grant by searching for the same format size of the DCI message. If the DL grant is communicated on the SCC and the UL grant is communicated on the PCC, then the UE searches for a format size of a DCI message for the DL grant on the SCC and additionally searches for a format size of a DCI message for the UL grant on the PCC, which may increase UE complexity. In such a case, the UE may search on the SCC for a format size of a DCI message that is specific to a transmission mode (TM) and also search for a fallback mode format size of a DCI message (e.g., a size of Format 1A grant of Format 0/1A) when searching for a DL grant. It is noted that Format 1A of the DCI message may be used as a fallback mode for DL scheduling. For example, if a UE is configured to operate in TM 4, the UE may search for two format sizes on the SCC (e.g., when searching for a DL grant). One format size to be searched may be a DCI format size corresponding to TM 4, which is DCI Format 2. The other format size to be searched may be a DCI format size corresponding to DCI Format 1A. The UE may also search on the PCC for a format size of a DCI format (e.g., Format 0 grant of Format 0/1A) when searching for a UL grant. It is noted that Format 0 of the DCI message may be used for UL scheduling. In one aspect, to reduce the UE complexity, the following two approaches may be utilized.

According to a first approach of the aspect, in order to monitor for the UL grant and/or the DL grant, the UE may be configured to search on the SCC for a DCI format size that is specific to a TM, without searching for a fallback mode format size of a DCI message. For example, according to the first approach of the aspect, if a UE is configured to operate with TM 4, the UE may search for a DCI format size corresponding to TM 4, which is DCI Format 2, and may not search for a size corresponding to DCI Format 1A associated with a fallback mode. In the first approach of the aspect, the UE may assume that there is no fall back mode on the SCC, and perform a TM-specific size search. Because the first approach reduces the number of searches performed by the UE, by limiting searching to the DCI format size specific to a TM without searching for fallback mode format size of a DCI message, the first approach may reduce the UE complexity.

According to a second approach of the aspect, the eNB may provide the UE with blind decode information on a number of blind decodes (e.g., a maximum number of blind decodes) to perform per subframe, to detect a UL grant and/or a DL grant. The eNB may provide the UE with such blind decode information semi-statically. In particular, according to the blind decode information, the UE may decode all candidates for a UL grant and/or a DL grant in some subframes, and may decode a subset of candidates for a UL grant and/or a DL grant in other subframes, based on the number of blind decodes specified in the blind decode information. For example, the UE may decode for both a DL grant and a UL grant in some subframes if the blind decode information provides a maximum number of blind decodes, and may decode either a DL grant or a UL grant in the subframes if the blind decode information provides less number of blind decodes. In the second approach, UE complexity may be reduced because not all candidates are decoded for every subframe, unlike a configuration where all candidates are decoded for every subframe.

In another aspect of the disclosure, a cross-carrier indicator may be communicated to a UE on one carrier to indicate that a grant will be sent on another carrier. For example, in self-scheduling for DL communication, the eNB may send a cross-carrier indicator to the UE on the PCC to indicate that a DL grant will be sent on the SCC. It is noted that transmitting a DL grant on the PCC for the DL data communication on the SCC may incur more overhead on the PCC. In this aspect of the disclosure, because a eNB does not send the DL grant on the PCC, the amount of overhead on the PCC and/or a number of blind decodes performed by the UE may be reduced. Because presence or absence of a DL grant on the SCC is indicated in the cross-carrier indicator received on the PCC, the UE may monitor for the DL grant on the SCC based on the cross-carrier indicator. Utilizing the cross-carrier indicator instead of transmitting a DL grant on the PCC may reduce UE complexity (e.g., by reducing the number of blind decodes by the UE). Further, utilizing the cross-carrier indicator may reduce adverse impact of signal interference causing the UE to fail to utilize a DL grant for DL communication. For example, if the UE attempts to receive a DL grant on a SCC for DL data communication on the SCC, the UE may not be able to decode the DL grant due to high signal interference. The UE may not report a message indicating acknowledge/negative-acknowledge (ACK/NACK message) of a DL grant when the UE fails to decode the DL grant and thus does not receive the DL grant. This in turn may cause the UE and the eNB to be out of synchronization. Because a licensed spectrum is more reliable than an unlicensed spectrum, the UE may successfully receive the cross-carrier indicator on the licensed spectrum, e.g., the PCC, to indicate the presence of the DL grant on the SCC. The UE may report to the eNB an ACK/NACK message for the DL grant on the SCC, based on the cross-carrier indicator received on the PCC, even if the UE does not receive the DL grant on the SCC due to high signal interference. This may reduce the chances of the UE and eNB getting out of synchronization.

Several approaches may be utilized to indicate the cross-carrier indication to the UE. According to one approach, the eNB may include the cross-carrier indicator in a new DCI message with a new format and transmit the new DCI message with the new format on the PCC in a common search space. The cross-carrier indicator may be protected with a new RNTI that is known to a group of UEs. The size of the new DCI message with the new DCI format may be the same as the size of an existing DCI message. The eNB may indicate to each UE via an RRC configuration that certain bits in the new DCI message on the PCC may be monitored for the cross-carrier indicator to determine if a DL grant is communicated.

According to another approach, instead of a group indication of a grant, the eNB may indicate separately to each UE whether there is a grant or not. In particular, the eNB may provide a separate indication to each UE by sending a DCI message including a cross-carrier indicator in a corresponding UE-specific search space of each UE, instead of sending the DCI message in the common search space.

In another aspect of the disclosure, the eNB may configure the scheduling mode as a function of a TDD subframe configuration. Table 1 illustrates example TDD DL/UL subframe configurations that may be utilized for the PCell and/or the SCell.

TABLE 1

LTE TDD DL/UL Subframe Configurations

| Uplink-downlink configuration | Downlink-to-uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In particular, scheduling for UL communication may depend on whether the TDD subframe configuration used by the SCell is a DL heavy configuration or a UL heavy configuration. A subframe configuration with more DL subframes than other types of subframes may be considered a DL heavy TDD configuration. A subframe configuration with more UL subframes than other types of subframes may be considered a UL heavy TDD configuration. For example, Subframe Configuration #5 may be considered a DL heavy TDD configuration because there are eight DL subframes out of ten subframes. For example, Subframe Configuration #0 may be considered a UL heavy TDD configuration because there are six UL subframes out of ten subframes. For UL communication, if the SCell uses a DL heavy configuration, the SCell may schedule UL data communication on an unlicensed carrier using a UL grant on the unlicensed carrier (e.g., self-scheduling for UL). It is noted that, for DL communication, self-scheduling is utilized regardless of whether the SCell uses a DL heavy configuration or a UL heavy configuration. Thus, according to this aspect of the disclosure, utilizing the DL heavy TDD configuration by the SCell results in self-scheduling for both UL and DL communications. On the contrary, for UL communication, if the SCell uses a UL heavy TDD configuration, the PCell may utilize cross-carrier scheduling for UL communication. For DL communication, as discussed above, self-scheduling is utilized regardless of whether the SCell uses a DL heavy configuration or a UL heavy configuration. Thus, utilizing the UL heavy TDD configuration by the SCell results in cross-carrier scheduling for UL communication and self-scheduling for DL communication.

In an aspect, the eNB may configure the scheduling mode for each of the carriers independently, where the carriers may include a licensed carrier (e.g., the PCC) and one or more unlicensed carriers (e.g., one or more SCCs). The eNB may configure the scheduling mode independently for each of the carriers based on signal interference and channel occupancy observed on each carrier. For example, the eNB may first perform a CCA procedure to clear a channel for transmitting information (e.g., a grant) to the UE. A channel may be cleared if an energy observed in the channel is lower than an energy threshold. For example, if the channel is occupied by another device or experiences strong interference, the channel may observe high energy above the energy threshold and thus the eNB may not be able to clear the channel. The signal interference and channel occupancy on a channel may be reflected by whether a channel can be cleared for communication. It is noted that some eNBs (e.g., eNBs with multi-antenna receivers) may be able to receive UL data from the UE even if no channel is cleared. In such a case, the eNB may still send the UL grant on a licensed carrier (e.g., PCC) and receive UL data on an unlicensed carrier (e.g., SCC), and thus may not be affected by interference or channel occupancy.

In another aspect of the disclosure, a UL grant transmitted on the PCC may be mapped to a group of unlicensed carriers for UL data transmission based on the UL grant. When the UE receives a UL grant, the UE may be configured to determine whether the UL grant is mapped to a group of unlicensed carriers. The UE may transmit the UL data on any available (e.g., cleared) channel among the group of unlicensed carriers mapped to the UL grant. The UE may select a carrier to transmit the UL data from among the group of unlicensed carriers based on channel availability and/or priority of carriers. The channel availability may depend on whether a channel is cleared or not (e.g., CCA procedure), as discussed supra. For example, if three channels corresponding to three unlicensed carriers are cleared, the UE may select a channel associated with an unlicensed carrier of the highest priority, and transmit the UL data on the unlicensed carrier corresponding to the selected channel. The eNB may blind detect the unlicensed carrier that the UE uses to transmit the UL data.

In another aspect of the disclosure, a scalable enhanced PDCCH (EPDCCH) may be used. An EPDCCH may be used for resource allocation of control channel information. In particular, the eNB may assign resource blocks (RBs) to the EPDCCH. When the UE receives the EPDCCH from the eNB, the UE may determine, based on the EPDCCH, a certain set of RBs to monitor for subframes that carry UL grants. The number of RBs to monitor may be fixed semi-statically by the eNB. The number of grants that a subframe carries may vary depending on the subframe. Some DL subframes may carry more grants than other subframes if those grants are used to schedule UL subframes for multiple carriers in an unlicensed spectrum. For example, if a subframe has a lot of UL grants, more search space may be needed. For example, when using a TDD subframe configuration with two or three DL subframes (thus eight or seven UL subframes), each DL subframe may carry multiple UL grants for multiple subframes, which may benefit from a larger search space and more resources for monitoring UL grants. Therefore, according to an aspect of the disclosure, a scalable EPDCCH design is used such that an eNB may adjust the number of RBs/candidates to be monitored by the UE for a predetermined set of subframes which carry UL grants. The number of RBs and candidates (e.g., candidates for grants and/or a PDCCH) to monitor may be a function of the TDD configuration and/or the number of active unlicensed carriers. Depending on the TDD subframe configuration, the search space for the UL grant may be increased or reduced. For example, if the TDD configuration is a UL heavy configuration having more UL subframes than other subframes, the eNB may assign more resource blocks to the EPDCCH, thereby increasing a search space for UL grants. On the contrary, if the TDD configuration is a DL heavy configuration having more DL sub frames than other subframes, the eNB may assign less resource blocks to the EPDCCH, thereby reducing a search space for UL grants. In addition, the eNB may configure a number of candidates or aggregation levels to monitor in a PDCCH, and may further configure at least one of a number of sets of EPDCCHs, a number of resource blocks (RBs) for each set of EPDCCHs, a type of EPDCCH, or a number of candidates or aggregation levels for EPDCCH monitoring.

Figure 8:
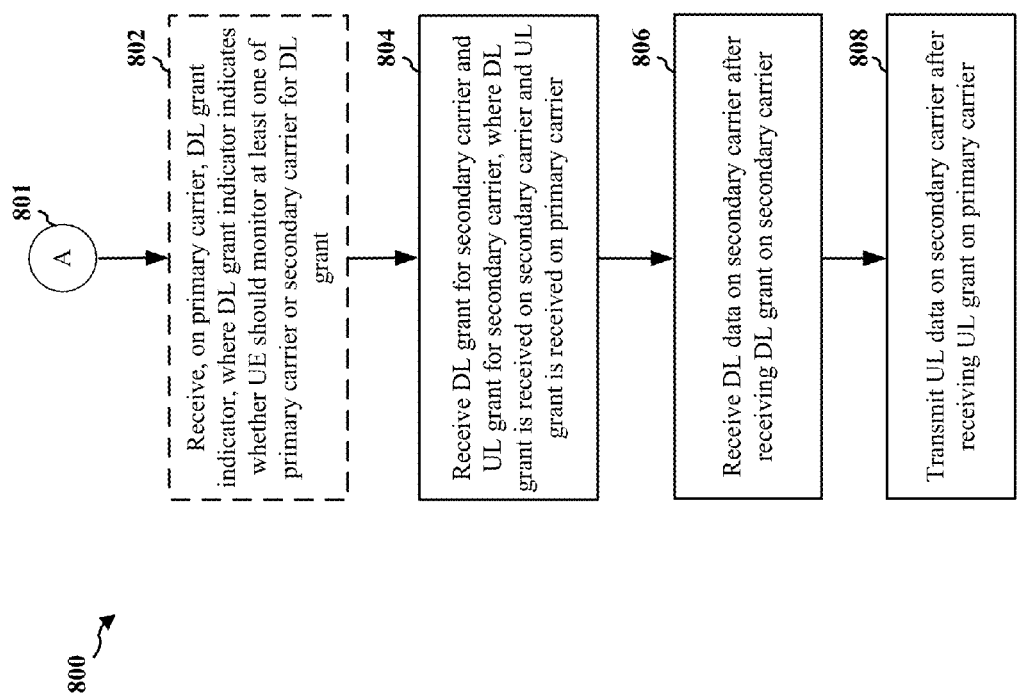
FIG. 8 is a flow chart of a method of wireless communication.

FIG. 8 is a flow chart 800 of a method of wireless communication. The method may be performed by a UE (e.g., the UE 104, the UE 752, the apparatus 1102/1102'). At block 801, one or more additional methods discussed infra may be performed. Blocks with dotted lines may include optional features or steps.

In one aspect, at block 802, the UE may receive, on the primary carrier, a DL grant indicator, where the DL grant indicator indicates whether the UE should monitor at least one of the primary carrier or the secondary carrier for the DL grant. In an aspect, the DL grant indicator is received in a DCI message on the primary carrier in a common search space and is protected with an RNTI that is known to a group of UEs. In such an aspect, the UE monitors for the DL grant indicator in the DCI message on the primary carrier based on an RRC configuration. In an aspect, the DL grant indicator is received on the primary carrier in a search space that is specific to a user equipment.

For example, as discussed supra, in self-scheduling for DL communication, the eNB may send a cross-carrier indicator to the UE on the PCC to indicate that a DL grant will be sent on the SCC. For example, as discussed supra, because presence or absence of a DL grant on the SCC is indicated in the cross-carrier indicator received on the PCC, the UE may monitor for the DL grant on the SCC based on the cross-carrier indicator. For example, as discussed supra, the eNB may include the cross-carrier indicator in a new DCI message with a new format and transmit the new DCI message with the new format on the PCC in the common search space, and the cross-carrier indicator may be protected with a new RNTI that is known to a group of UEs. For example, as discussed supra, the eNB may provide a separate indication to a UE by sending a DCI message including a cross-carrier indicator in a UE-specific search space, instead of sending the DCI message in the common search space.

At block 804, the UE receives a DL grant for a secondary carrier and a UL grant for the secondary carrier, where the DL grant is received on the secondary carrier and the UL grant is received on a primary carrier. For example, as discussed supra, the UE may be configured to receive, on a secondary carrier, a DL grant for the secondary carrier, and to receive, on a primary carrier, a UL grant for the secondary carrier. For example, referring back to FIG. 7, the UE 752 may receive, at 762, a UL grant in the control region 712 of the PCC, where the UL grant is for UL communication on the SCC, and may receive, at 772, a DL grant in the control region 722 of the SCC, where the DL grant is for DL communication on the SCC.

At block 806, the UE may receive DL data on the secondary carrier after receiving the DL grant on the secondary carrier. For example, as discussed supra, the UE may be configured to receive DL data on the secondary carrier based on the DL grant, according to the self-scheduling mode. For example, referring back to FIG. 7, after receiving the DL grant on the SCC, the UE 752 may receive, at 774, DL data in the data region 724 of the SCC based on the DL grant, as indicated by the arrow 728.

At block 808, the UE may transmit UL data on the secondary carrier after receiving the UL grant on the primary carrier. For example, as discussed supra, according to the cross-carrier scheduling mode, the UE may be configured to receive, on a primary carrier, a UL grant for the secondary carrier and transmit UL data on the secondary carrier based on the UL grant. For example, referring back to FIG. 7, after receiving the UL grant on the PCC, the UE 752 may transmit, at 764, based on the UL grant, UL data in the data region 724 of the SCC, as indicated by the arrow 726.

In an aspect, the primary carrier is a licensed carrier and the secondary carrier is an unlicensed carrier. In an aspect, the DL grant and the UL grant are received from a base station using a configuration where DL grants are received by the UE on the secondary carrier and UL grants are received by the UE on the primary carrier. In an aspect, the DL grant and the UL grant are received from a base station using a configuration where DL grants are scheduled by self-scheduling on the secondary carrier and UL grants are scheduled by cross-carrier scheduling on the primary carrier. For example, as discussed supra, the primary carrier may be a licensed carrier (e.g., a PCC) and the secondary carrier may be an unlicensed carrier (e.g., an SCC).

FIG. 9A is a flow chart 900 of a method of wireless communication expanding from the flow chart 800 of FIG. 8, according to an aspect of the disclosure. The method may be performed by a UE (e.g., the UE 104, the UE 752, the apparatus 1102/1102'). The flow chart 900 expands from block 801 of FIG. 8. For example, the method in the flow chart 900 may be performed to monitor for a DL grant and/or a UL grant, such that the UE may receive the DL grant and the UL grant at block 804 of FIG. 8. In an aspect, the UE may continue at block 802 or block 804 of FIG. 8 after performing the features of the flow chart 900.

At block 902, the UE may receive information about at least one of a set of DCI formats or DCI format sizes of respective DCI messages to monitor on each subframe on each carrier. For example, as discussed supra, if a DL grant is communicated on a first carrier and a UL grant is communicated on a second carrier different from the first carrier, the UE may search for a format size of a DCI message for the DL grant on the first carrier and additionally search for a format size of a DCI message for the UL grant on the second carrier. For example, in one aspect, the UE may receive the information about the at least one of a set of DCI formats or DCI format sizes of respective DCI messages by analyzing on the DCI messages received by the UE.

At block 904, the UE monitors for at least one of the UL grant or the DL grant based on the information. In an aspect, each of the DCI format sizes of the respective DCI messages is specific to a transmission mode. For example, as discussed supra, the UE may be configured to search on the SCC for a DCI format size that is specific to a TM, in order to monitor for the UL grant and/or the DL grant, without searching for a fallback mode format size of a DCI message. For example, as discussed supra, the UE may assume that there is no fall back mode on the SCC, and perform a TM-specific size search.

FIG. 9B is a flow chart 950 of a method of wireless communication expanding from the flow chart 800 of FIG. 8, according to an aspect of the disclosure. The method may be performed by a UE (e.g., the UE 104, the UE 752, the apparatus 1102/1102'). The flow chart 950 expands from block 801 of FIG. 8. For example, the method in the flow chart 950 may be performed to detect a DL grant and/or a UL grant, such that the UE may receive the DL grant and the UL grant at block 804 of FIG. 8. In an aspect, the UE may continue at block 802 or block 804 of FIG. 8 after performing the operations of the flow chart 950.

At block 952, the UE may receive information on a number of blind decodes to perform per subframe. For example, as discussed supra, the UE may receive from the eNB blind decode information on a number of blind decodes (e.g., a maximum number of blind decodes) to perform per subframe, to detect a UL grant and/or a DL grant. For example, as discussed supra, the UE may receive from the eNB such blind decode information semi-statically.

At block 954, the UE may blind decode based on the number of blind decodes to detect at least one of the DL grant or the UL grant. For example, as discussed supra, according to the blind decode information, the UE may decode all candidates in some subframes, and may decode a subset of candidates, based on the number of blind decodes specified in the blind decode information. For example, as discussed supra, the UE may decode both a DL grant and a UL grant for some subframes if the blind decode information provides a maximum number of blind decodes, and may decode either a DL grant or a UL grant if the blind decode information provides less number of blind decodes.

Figures 10A, 10B:
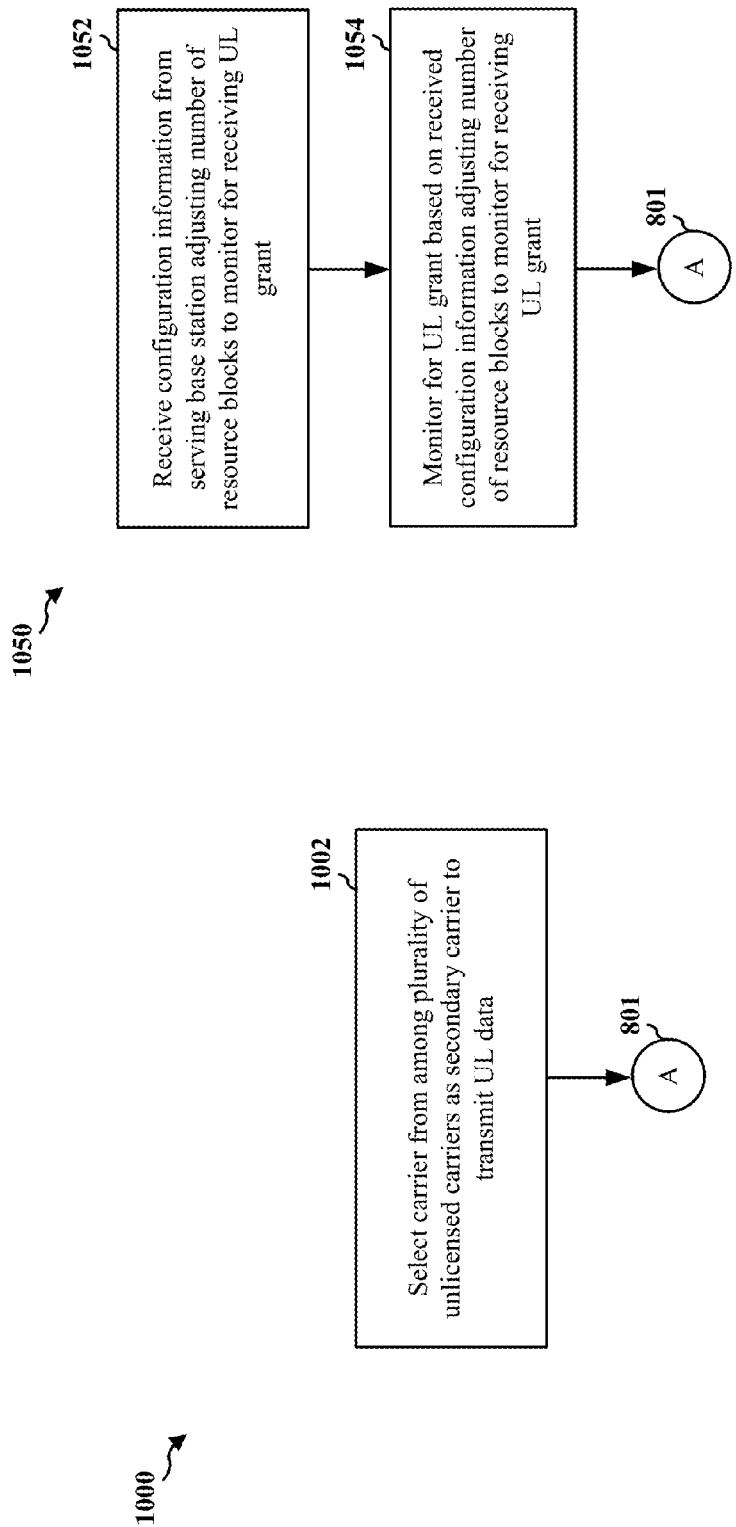
FIG. 10A is a flow chart of a method of wireless communication expanding from the flow chart of FIG. 11, according to an aspect of the disclosure.
FIG. 10B is a flow chart of a method of wireless communication expanding from the flow chart of FIG. 11, according to an aspect of the disclosure.

FIG. 10A is a flow chart 1000 of a method of wireless communication expanding from the flow chart 800 of FIG. 8, according to an aspect of the disclosure. The method may be performed by a UE (e.g., the UE 104, the UE 752, the apparatus 1102/1102'). The flow chart 1000 expands from block 801 of FIG. 8. For example, the method in the flow chart 1000 may be performed to select a carrier to transmit UL data, such that the UE may transmit the UL data at block 808 of FIG. 8. In an aspect, the UE may continue at block 802 or block 804 of FIG. 8 after performing the features of the flow chart 1000.

At block 1002, where the UL grant received on the primary carrier corresponds to a plurality of unlicensed carriers, the UE selects a carrier from among the plurality of unlicensed carriers as the secondary carrier to transmit the UL data. In an aspect, the UE selects the carrier from among the plurality of unlicensed carriers by determining channel availability of channels associated with the plurality of unlicensed carriers, where a channel is available when an energy of the channel is lower than an energy threshold, and selecting the carrier associated with the channel for transmission of the UL data based on at least one of the channel availability or a carrier priority.

For example, as discussed supra, when the UE receives a UL grant, the UE may be configured to determine whether the UL grant is mapped to a group of unlicensed carriers. For example, as discussed supra, the UE may select a carrier to transmit the UL data from among the group of unlicensed carriers based on channel availability and/or priority of the carriers, where the channel availability may depend on whether a channel is cleared or not.

FIG. 10B is a flow chart 1050 of a method of wireless communication expanding from the flow chart 800 of FIG.

8, according to an aspect of the disclosure. The method may be performed by a UE (e.g., the UE 104, the UE 752, the apparatus 1102/1102'). The flow chart 1050 expands from block 801 of FIG. 8. For example, the method in the flow chart 1050 may be performed to monitor for a UL grant, such that the UE may receive the UL grant at block 804 of FIG. 8. In an aspect, the UE may continue at block 802 or block 804 of FIG. 8 after performing the features of the flow chart 1050.

At block 1052, the UE may receive configuration information from a serving base station adjusting a number of resource blocks to monitor for receiving the UL grant. For example, as discussed supra, a scalable EPDCCH design may be used such that the serving base station (e.g., an eNB) may adjust the number of RBs/candidates to be monitored by the UE for a defined set of subframes which may carry UL grants. For example, as discussed supra, when the UE receives the EPDCCH from the eNB, the UE determines, based on the EPDCCH, a certain set of RBs to monitor for subframes that may carry UL grants.

At block 1054, the UE monitors for the UL grant based on the received configuration information adjusting the number of resource blocks to monitor for receiving the UL grant. For example, as discussed supra, depending on the TDD subframe configuration, the search space for the UL grant may be increased or reduced. For example, as discussed supra, if the TDD configuration has more UL subframes than other subframes, more resource blocks may be assigned to the EPDCCH, thereby increasing a search space for UL grants. For example, as discussed supra, if the TDD configuration has more DL subframes than other subframes, less resource blocks may be assigned to the EPDCCH, thereby reducing a search space for UL grants.

Figure 11:
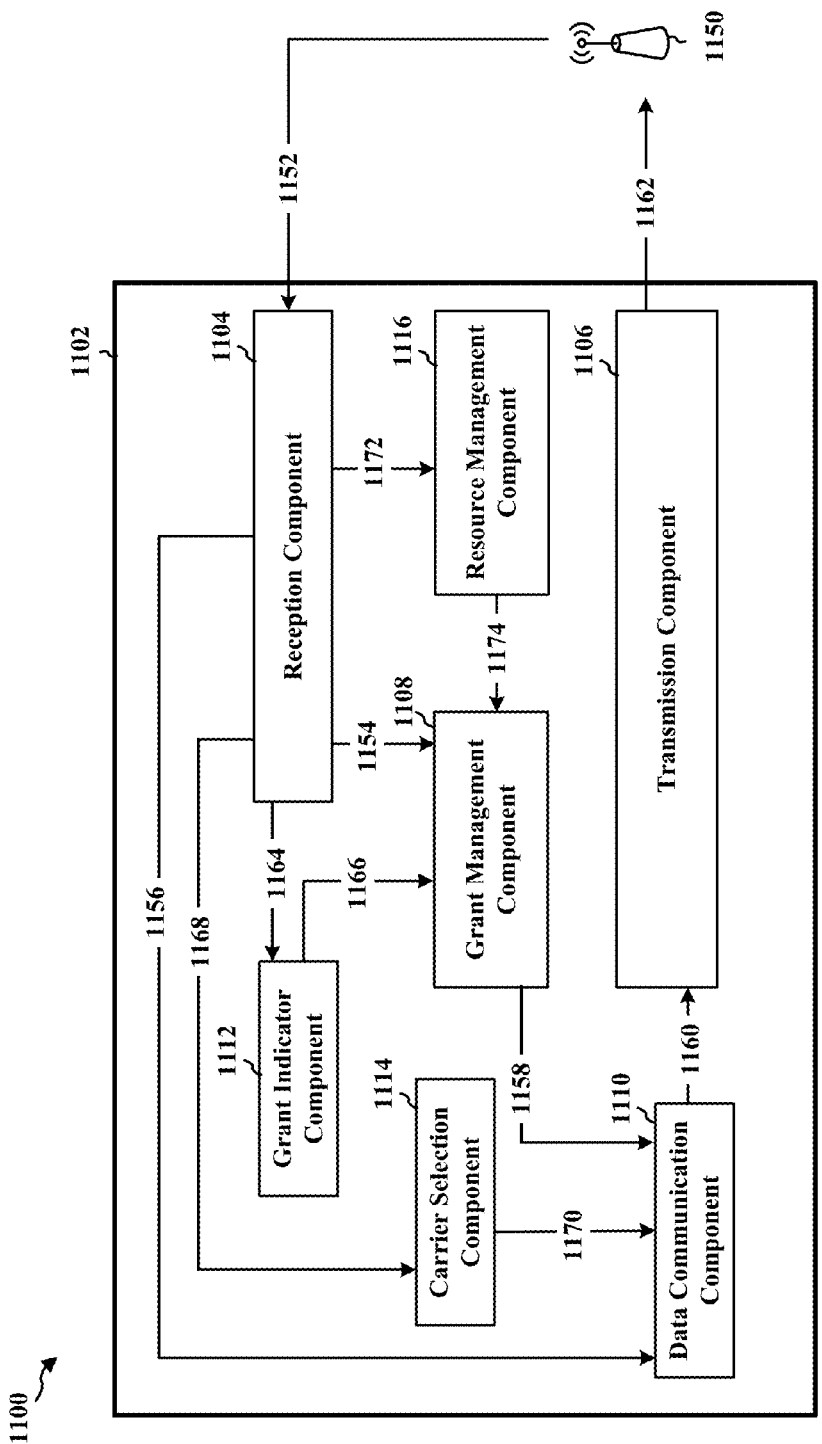
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The apparatus includes a reception component 1104, a transmission component 1106, a grant management component 1108, a data communication component 1110, a grant indicator component 1112, a carrier selection component 1114, and a resource management component 1116.

The grant management component 1108 receives from the eNB 1150 at 1152 and 1154, via the reception component 1104, a DL grant for a secondary carrier and a UL grant for the secondary carrier, where the DL grant is received on the secondary carrier and the UL grant is received on a primary carrier. The data communication component 1110 receives from the eNB 1150 at 1152 and 1156, via the reception component 1104, DL data on the secondary carrier after receiving the DL grant on the secondary carrier via 1158. The data communication component 1110 transmits to the eNB 1150 at 1160 and 1162, via the transmission component 1106, UL data on the secondary carrier after receiving the UL grant on the primary carrier via 1158. In an aspect, the primary carrier is a licensed carrier and the secondary carrier is an unlicensed carrier. In an aspect, the DL grant and the UL grant are received from a base station using a configuration where DL grants are received by the UE on the secondary carrier and UL grants are received by the UE on the primary carrier. In an aspect, the DL grant and the UL grant are received from a base station using a configuration where DL grants are scheduled by self-scheduling on the secondary carrier and UL grants are scheduled by cross-carrier scheduling on the primary carrier.

The grant management component 1108 receives at 1152 and 1154 via the reception component 1104 information about at least one of a set of DCI formats or DCI format sizes of respective DCI messages to monitor on each subframe on each carrier. The grant management component 1108 monitors via 1152 and 1154 for at least one of the UL grant or the DL grant based on the information. In an aspect, each of the DCI format sizes of the respective DCI messages is specific to a transmission mode.

The grant management component 1108 receives at 1154 via the reception component 1104 information at 1152 (from the eNB 1150) on a number of blind decodes to perform per subframe. The grant management component 1108 blind decodes based on the number of blind decodes to detect at least one of the DL grant or the UL grant.

The grant indicator component 1112 may receive at 1164, via the reception component 1104 at 1152, on the primary carrier, a DL grant indicator, where the DL grant indicator indicates whether the UE should monitor (e.g., at 1166 via the grant management component 1108) at least one of the primary carrier or the secondary carrier for the DL grant. In an aspect, the DL grant indicator is received in a DCI message on the primary carrier in a common search space and is protected with an RNTI that is known to a group of UEs. In such an aspect, the grant indicator component 1112 monitors via 1152 and 1164 for the DL grant indicator in the DCI message on the primary carrier based on an RRC configuration. In an aspect, the DL grant indicator is received on the primary carrier in a search space that is specific to a user equipment.

Where the UL grant received on the primary carrier corresponds to a plurality of unlicensed carriers, the carrier selection component 1114 selects a carrier from among the plurality of unlicensed carriers as the secondary carrier to transmit the UL data, where information about unlicensed carriers may be provided by the reception component 1104 at 1168. In an aspect, the carrier selection component 1114 selects the carrier from among the plurality of unlicensed carriers by determining channel availability of channels associated with the plurality of unlicensed carriers, where a channel is available when an energy of the channel is lower than an energy threshold, and selecting the carrier associated with the channel for transmission of the UL data (e.g., at 1168 and 1170 via the data communication component 1110) based on at least one of the channel availability or a carrier priority.

The resource management component 1116 receives at 1172, via the reception component 1104 at 1152, configuration information from a serving base station (e.g., eNB 1150) adjusting a number of resource blocks to monitor for receiving the UL grant (e.g., at 1174 via the grant management component 1108). The grant management component 1108 monitors for the UL grant based on the received configuration information adjusting the number of resource blocks to monitor for receiving the UL grant via 1174.

The apparatus may include additional components that perform each of the blocks of the algorithm in the aforementioned flowcharts of FIGS. 8-10. As such, each block in the aforementioned flowcharts of FIGS. 8-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
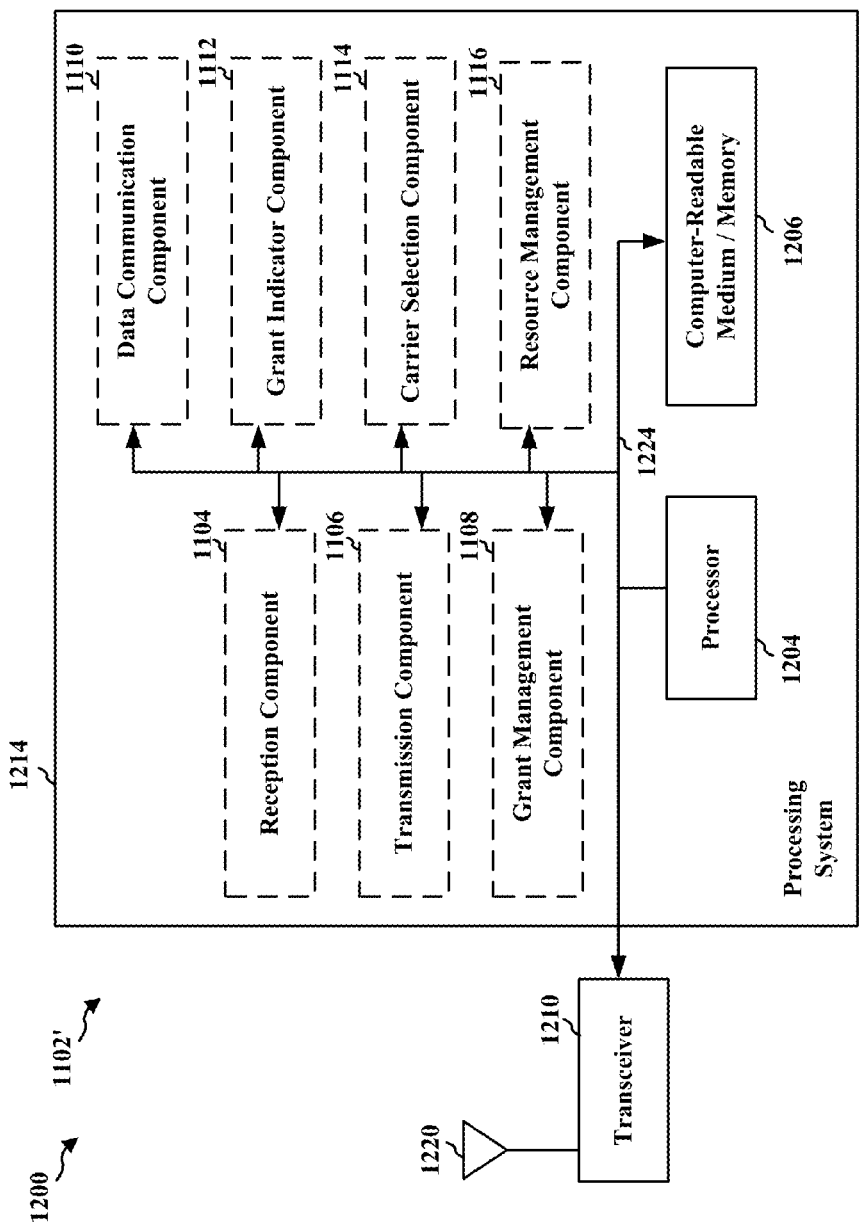
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112, 1114, 1116, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112, 1114, 1116. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for receiving a DL grant for a secondary carrier and a UL grant for the secondary carrier, where the DL grant is received on the secondary carrier and the UL grant is received on a primary carrier, means for receiving DL data on the secondary carrier after receiving the DL grant on the secondary carrier, and means for transmitting UL data on the secondary carrier after receiving the UL grant on the primary carrier. The apparatus 1102/1102' further includes means for receiving information about at least one of a set of DCI formats or DCI format sizes of respective DCI messages to monitor on each subframe on each carrier, and means for monitoring for at least one of the UL grant or the DL grant based on the information. The apparatus 1102/1102' further includes means for receiving information on a number of blind decodes to perform per subframe, and means for blind decoding based on the number of blind decodes to detect at least one of the DL grant or the UL grant. The apparatus 1102/1102' further includes means for receiving, on the primary carrier, a DL grant indicator, where the DL grant indicator indicates whether the UE should monitor at least one of the primary carrier or the secondary carrier for the DL grant. The apparatus 1102/1102' further includes means for selecting a carrier from among the plurality of unlicensed carriers as the secondary carrier to transmit the UL data, where the UL grant received on the primary carrier corresponds to a plurality of unlicensed carriers. The apparatus 1102/1102' further includes means for receiving configuration information from a serving base station adjusting a number of resource blocks to monitor for receiving the UL grant, and means for monitoring for the UL grant based on the received configuration information adjusting the number of resource blocks to monitor for receiving the UL grant.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
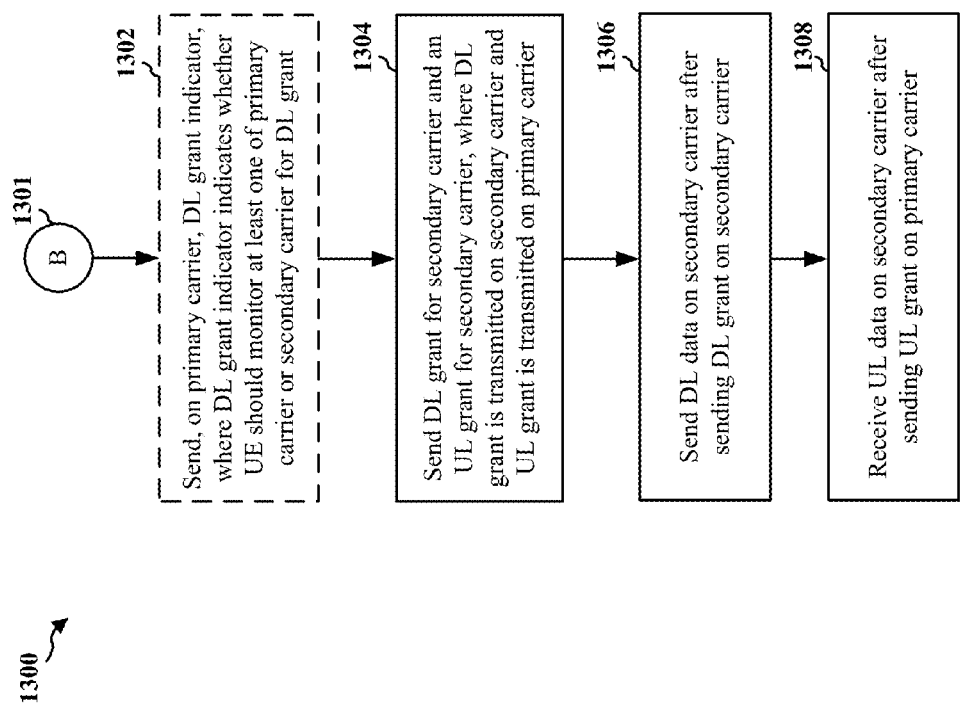
FIG. 13 is a flow chart of a method of wireless communication.

FIG. 13 is a flow chart 1300 of a method of wireless communication. The method may be performed by a base station (e.g., the base station 102, the eNB 754 104, the apparatus 1602/1602'). At block 1301, one or more additional methods discussed infra may be performed. Blocks with dotted lines may include optional features or steps.

In one aspect, at block 1302, the eNB may send, on the primary carrier, a DL grant indicator, where the DL grant indicator indicates whether the UE should monitor at least one of the primary carrier or the secondary carrier for the DL grant. In an aspect, the DL grant indicator is sent in a DCI message on the primary carrier in a common search space and is protected with an RNTI that is known to a group of user equipments. In an aspect, the DL grant indicator is received on the primary carrier in a search space that is specific to a user equipment.

For example, as discussed supra, in self-scheduling for DL communication, the eNB may send a cross-carrier indicator to the UE on the PCC to indicate that a DL grant will be sent on the SCC. For example, as discussed supra, because presence or absence of a DL grant on the SCC is indicated in the cross-carrier indicator received on the PCC, the UE may monitor for the DL grant on the SCC based on the cross-carrier indicator. For example, as discussed supra, the eNB may include the cross-carrier indicator in a new DCI message with a new format and transmit the new DCI message with the new format on the PCC in the common search space, and the cross-carrier indicator may be protected with a new RNTI that is known to a group of UEs. For example, as discussed supra, the eNB may provide separate indication to UE by sending a DCI message including a cross-carrier indicator in a UE-specific search space, instead of sending the DCI message in the common search space.

At block 1304, the eNB sends a DL grant for a secondary carrier and a UL grant for the secondary carrier, where the DL grant is transmitted on the secondary carrier and the UL grant is transmitted on a primary carrier. For example, as discussed supra, the eNB may transmit, on a secondary carrier, a DL grant for the secondary carrier, and transmit, on a primary carrier, a UL grant for the secondary carrier. For example, referring back to FIG. 7, the eNB 754 may send, at 762, a UL grant to the UE 752 in the control region 712 of the PCC, where the UL grant is for UL communication on the SCC, and may send, at 772, a DL grant to the UE 752 in the control region 722 of the SCC, where the DL grant is for DL communication on the SCC.

At block 1306, the eNB sends DL data on the secondary carrier after sending the DL grant on the secondary carrier. For example, as discussed supra, the eNB may send DL data on the secondary carrier based on the DL grant, according to the self-scheduling mode. For example, referring back to FIG. 7, after sending the DL grant on the SCC, the eNB 754 may send, at 774, DL data in the data region 724 of the SCC based on the DL grant, as indicated by the arrow 728.

At block 1308, the eNB receives UL data on the secondary carrier after sending the UL grant on the primary carrier. For example, as discussed supra, according to the cross-carrier scheduling mode, the eNB may send, on a primary carrier, a UL grant for the secondary carrier and send UL data on the secondary carrier based on the UL grant. For example, referring back to FIG. 7, after sending the UL grant on the PCC, the eNB 754 may receive, at 764, based on the UL grant, UL data in the data region 724 of the SCC, as indicated by the arrow 726.

In an aspect, the primary carrier is a licensed carrier, and the secondary carrier is an unlicensed carrier. In an aspect, the DL grant and the UL grant are transmitted from the eNB using a configuration where DL grants are communicated on the secondary carrier and UL grants are communicated on the primary carrier. In an aspect, the DL grant and the UL grant are transmitted from the eNB using a configuration where DL grants are scheduled by self-scheduling on the secondary carrier and UL grants are scheduled by cross-carrier scheduling on the primary carrier. For example, as discussed supra, the primary carrier may be a licensed carrier (e.g., a PCC) and the secondary carrier may be an unlicensed carrier (e.g., an SCC).

In an aspect, the secondary carrier to receive the UL data is a carrier selected among a plurality of unlicensed carriers, and the UL grant sent on the primary carrier is specified for the plurality of unlicensed carriers. In such an aspect, the eNB is configured to blindly detect the selected carrier. For example, as discussed supra, when the UE receives a UL grant, the UE may be configured to determine whether the UL grant is mapped to a group of unlicensed carriers. For example, as discussed supra, the eNB may blind detect the unlicensed carrier that the UE uses to transmit the UL data.

FIG. 14A is a flow chart 1400 of a method of wireless communication expanding from the flow chart 1300 of FIG. 13, according to an aspect of the disclosure. The method may be performed by a base station (e.g., the base station 102, the eNB 754, the apparatus 1602/1602'). The flow chart 1400 expands from block 1301 of FIG. 13. For example, the method in the flow chart 1400 may be performed to provide information used to monitor for a DL grant and/or a UL grant, such that the UE may receive the DL grant and the UL grant when the DL grant and the UL grant is sent at block 1304 of FIG. 13. In an aspect, the base station may continue at block 1302 or block 1304 of FIG. 13 after performing the features of the flow chart 1400.

At block 1402, the eNB sends information about a set of DCI formats or DCI format sizes to monitor on each subframe on each carrier. In an aspect, each of the DCI format sizes is specific to a transmission mode. For example, as discussed supra, if a DL grant is communicated on a first carrier and a UL grant is communicated on a second carrier different from the first carrier, the UE may search for a format size of a DCI message for the DL grant on the first carrier and additionally search for a format size of a DCI message for the UL grant on the second carrier. For example, in one aspect, the UE may receive the information about the at least one of a set of DCI formats or DCI format sizes of respective DCI messages by analyzing on the DCI messages received by the UE. For example, as discussed supra, the UE may be configured to search on the SCC for a DCI format size that is specific to a TM, in order to monitor for the UL grant and/or the DL grant, without searching for a fallback mode format size of a DCI message.

FIG. 14B is a flow chart 1450 of a method of wireless communication expanding from the flow chart 1300 of FIG. 13, according to an aspect of the disclosure. The method may be performed by a base station (e.g., the base station 102, the eNB 754, the apparatus 1602/1602'). The flow chart 1450 expands from block 1301 of FIG. 13. For example, the method in the flow chart 1450 may be performed to provide configuration for the UE to perform blind decodes to detect a DL grant and/or a UL grant, such that the UE may receive the DL grant and the UL grant when the DL grant and the UL grant is sent at block 1304 of FIG. 13. In an aspect, the base station may continue at block 1302 or block 1304 of FIG. 13 after performing the features of the flow chart 1450.

At block 1452, the eNB sends configuration information, indicating a maximum number of blind decodes to be performed at the UE per subframe to detect at least one of the DL grant or the UL grant. For example, as discussed supra, the eNB may provide the UE with blind decode information on a number of blind decodes (e.g., a maximum number of blind decodes) to perform per subframe, to detect a UL grant and/or a DL grant. For example, as discussed supra, according to the blind decode information, the UE may decode all candidates in some subframes, and may decode a subset of candidates, based on the number of blind decodes specified in the blind decode information.

Figures 15A, 15B:
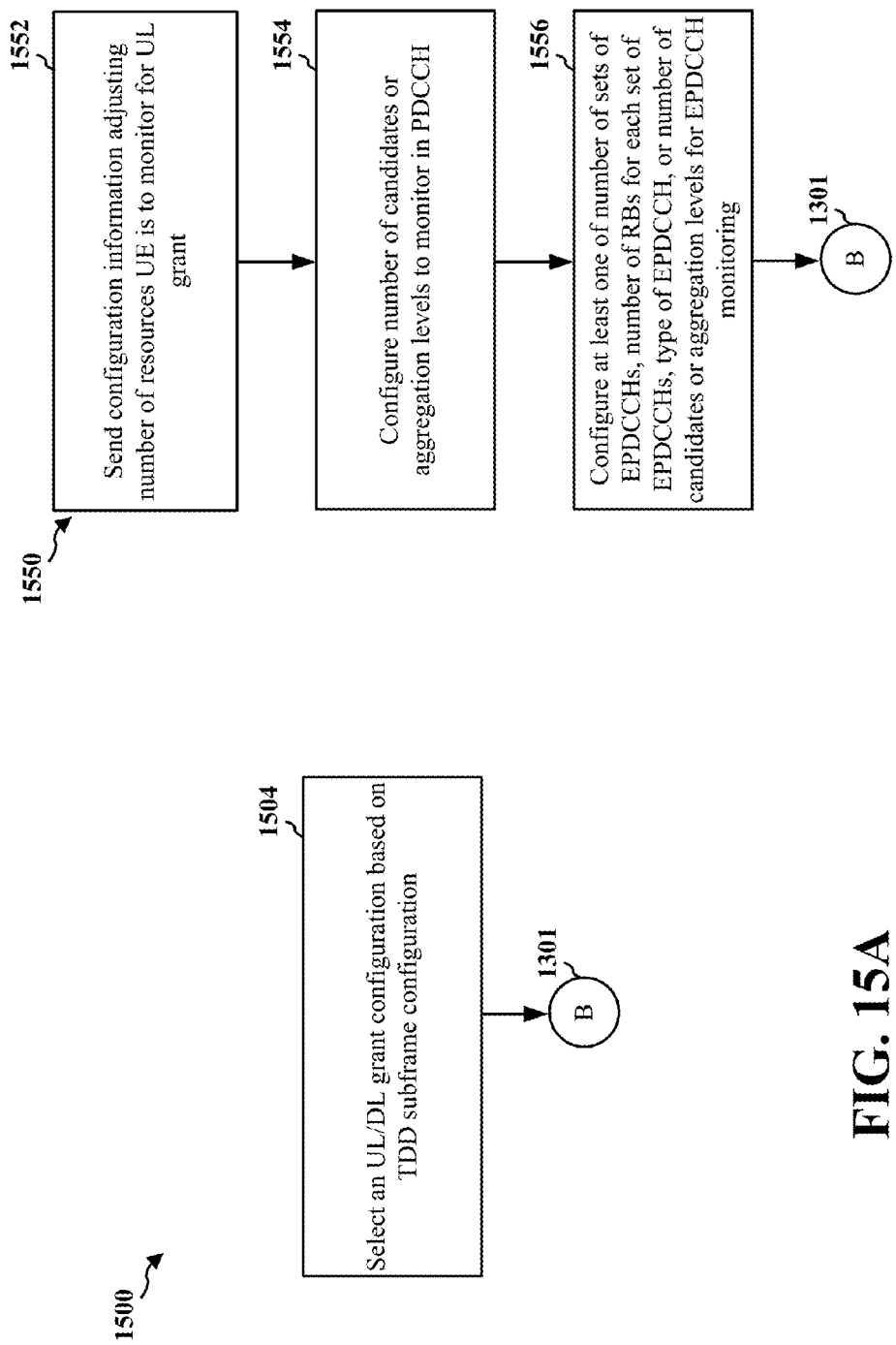
FIG. 15A is a flow chart of a method of wireless communication expanding from the flow chart of FIG. 16, according to an aspect of the disclosure.
FIG. 15B is a flow chart of a method of wireless communication expanding from the flow chart of FIG. 16, according to an aspect of the disclosure.

FIG. 15A is a flow chart 1500 of a method of wireless communication expanding from the flow chart 1300 of FIG. 13, according to an aspect of the disclosure. The method may be performed by a base station (e.g., the base station 102, the eNB 754, the apparatus 1602/1602'). The flow chart 1500 expands from block 1301 of FIG. 13. For example, the method in the flow chart 1500 may be performed to configure transmission of a UL grant and a DL grant at block 1304 of FIG. 13. In an aspect, the base station may continue at block 1302 or block 1304 of FIG. 13 after performing the features of the flow chart 1500.

At block 1504, the eNB selects an UL/DL grant configuration based on a TDD subframe configuration. In such an aspect, the UL/DL grant configuration includes sending DL grants on the secondary carrier and UL grants on the primary carrier when the TDD subframe configuration includes more UL subframes than DL subframes, and the UL/DL grant configuration includes sending DL grants on the secondary carrier and UL grants on the secondary carrier when the TDD subframe configuration includes more UL subframes than DL subframes. In an aspect, a scheduling mode is configured independently for each of available carriers including the primary carrier and the secondary carrier. In an aspect, the scheduling mode is configured based on at least one of interference or channel availability in each of the available carriers. In an aspect, a scheduling mode is configured independently for each of available carriers including the primary carrier and the secondary carrier, and independently for the UL grant and the DL grant.

For example, as discussed supra, the eNB may configure the scheduling mode as a function of TDD subframe configuration. For example, as discussed supra, if the SCell uses a DL heavy configuration (E.g., a configuration with more DL subframes than other types of subframes), the SCell may schedule UL data communication on an unlicensed carrier using a UL grant on the unlicensed carrier. For example, as discussed supra, if the SCell uses a UL heavy TDD configuration (E.g., a configuration with more UL subframes than other types of subframes), the PCell may utilize cross-carrier scheduling for UL communication. For example, as discussed supra, the eNB may configure the scheduling mode independently for each of carriers, where the carriers may include a licensed carrier (e.g., the PCC) and one or more unlicensed carriers (e.g., the SCC). For example, as discussed supra, the eNB may configure the scheduling mode independently for each of carriers based on signal interference and channel occupancy observed in each carrier.

FIG. 15B is a flow chart 1550 of a method of wireless communication expanding from the flow chart 1300 of FIG. 13, according to an aspect of the disclosure. The method may be performed by a base station (e.g., the base station 102, the eNB 754, the apparatus 1602/1602'). The flow chart 1550 expands from block 1301 of FIG. 13. For example, the method in the flow chart 1550 may be performed to provide the UE with information used to monitor for a UL grant, such that the UE may receive the UL grant when the UL grant is sent at block 1304 of FIG. 13. In an aspect, the base station may continue at block 1302 or block 1304 of FIG. 13 after performing the features of the flow chart 1550.

At block 1552, the eNB sends configuration information adjusting a number of resources the UE is to monitor for the UL grant. For example, as discussed supra, a scalable EPDCCH design may be used such that an eNB may adjust the number of RBs/candidates to be monitored by the UE for a defined set of subframes which carry UL grants. For example, as discussed supra, when the UE receives the EPDCCH from the eNB, the UE determines, based on the EPDCCH, a certain set of RBs to monitor for subframes that may carry UL grants.

At block 1554, the eNB configures a number of candidates or aggregation levels to monitor in a PDCCH. For example, as discussed supra, the eNB may configure a number of candidates or aggregation levels to monitor in a PDCCH. Based on the number of candidates or the aggregation levels, the UE may monitor for the UL grant.

At block 1556, the eNB configures at least one of a number of sets of EPDCCHs, a number of RBs for each set of EPDCCHs, a type of EPDCCH, or a number of candidates or aggregation levels for EPDCCH monitoring. In an aspect, the number of resources to monitor depends on at least one of a TDD subframe configuration or a number of active unlicensed carriers. For example, as discussed supra, the eNB may configure at least one of a number of sets of EPDCCHs, a number of RBs for each set of EPDCCHs, a type of EPDCCH, or a number of candidates or aggregation levels for EPDCCH monitoring.

Figure 16:
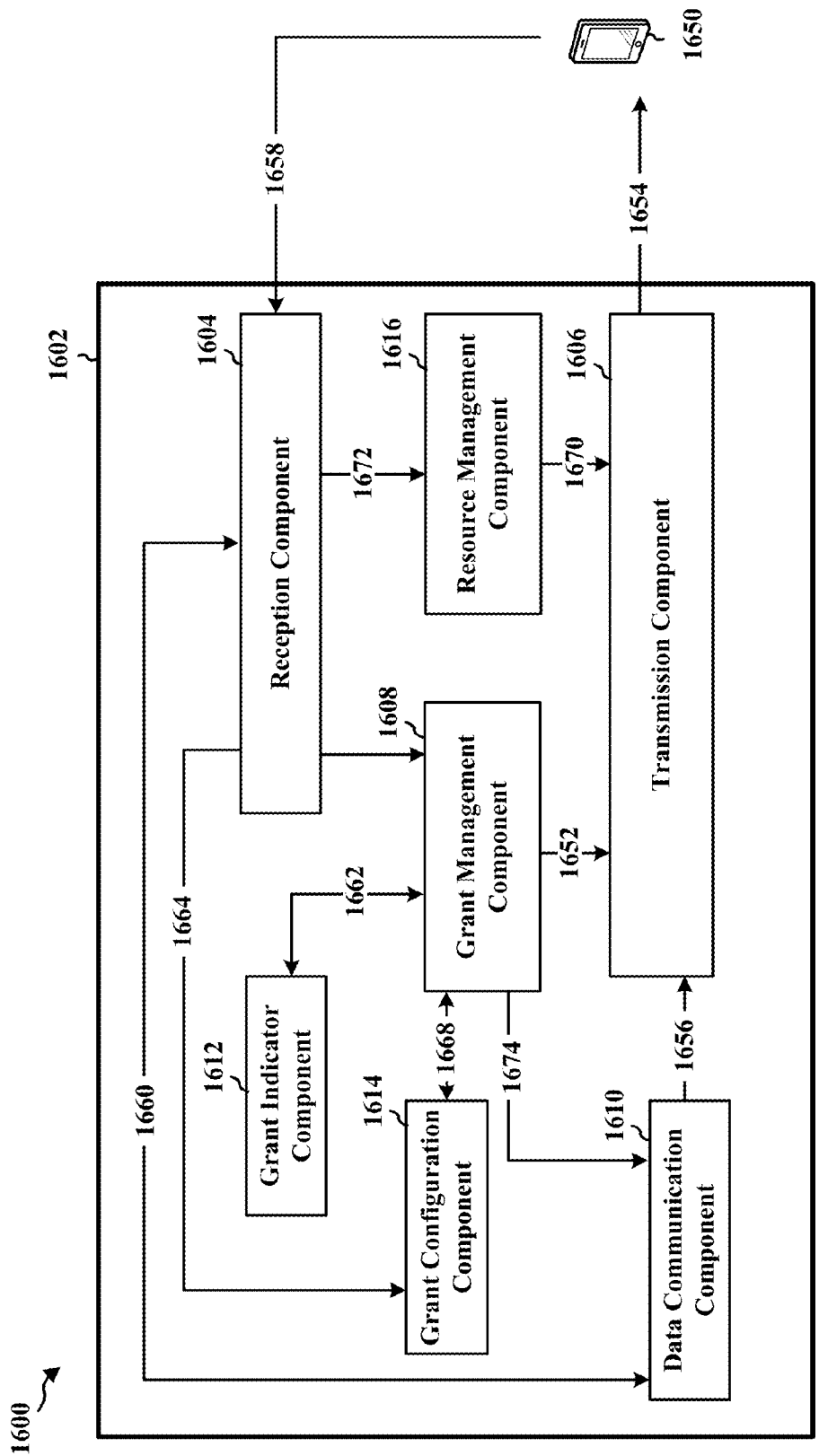
FIG. 16 is a conceptual data flow diagram illustrating the data flow between different means/components in an exemplary apparatus.

FIG. 16 is a conceptual data flow diagram 1600 illustrating the data flow between different means/components in an exemplary apparatus 1602. The apparatus may be an eNB. The apparatus includes a reception component 1604, a transmission component 1606, a grant management component 1608, a data communication component 1610, a grant indicator component 1612, a grant configuration component 1614, and a resource management component 1616.

The grant management component 1608 sends to the UE 1650 at 1652 and 1654, via the transmission component 1606, a DL grant for a secondary carrier and a UL grant for the secondary carrier, where the DL grant is transmitted on the secondary carrier and the UL grant is transmitted on a primary carrier. The data communication component 1610 sends to the UE 1650 at 1656 and 1654, via the transmission component 1606, DL data on the secondary carrier after sending the DL grant on the secondary carrier. In an aspect, the data communication component 1610 may communicate with the grant management component 1608, at 1674, to schedule transmission of DL data. The data communication component 1610 receives from the UE 1650 1658 and 1660, via the reception component 1604, UL data on the secondary carrier after sending the UL grant on the primary carrier. In an aspect, the primary carrier is a licensed carrier, and the secondary carrier is an unlicensed carrier. In an aspect, the DL grant and the UL grant are transmitted from the eNB using a configuration where DL grants are communicated on the secondary carrier and UL grants are communicated on the primary carrier. In an aspect, the DL grant and the UL grant are transmitted from the eNB using a configuration where DL grants are scheduled by self-scheduling on the secondary carrier and UL grants are scheduled by cross-carrier scheduling on the primary carrier.

In an aspect, the secondary carrier to receive the UL data is a carrier selected among a plurality of unlicensed carriers, and the UL grant sent on the primary carrier is specified for the plurality of unlicensed carriers. In such an aspect, the grant management component 1608 is configured to blindly detect the selected carrier.

The grant management component 1608 sends via the transmission component 1606 at 1652 and 1954 information about a set of DCI formats or DCI format sizes to monitor on each subframe on each carrier. In an aspect, each of the DCI format sizes is specific to a transmission mode. The grant management component 1608 sends configuration via the transmission component 1606 at 1652 and 1654, indicating a maximum number of blind decodes to be performed at the UE per subframe to detect at least one of the DL grant or the UL grant.

The grant indicator component 1612 may send via the grant management component 1608 and the transmission component 1606 at 1662, 1652, and 1654, on the primary carrier, a DL grant indicator, where the DL grant indicator indicates whether the UE should monitor at least one of the primary carrier or the secondary carrier for the DL grant. In an aspect, the DL grant indicator is sent in a DCI message on the primary carrier in a common search space and is protected with an RNTI that is known to a group of user equipments. In an aspect, the DL grant indicator is received on the primary carrier in a search space that is specific to a user equipment.

The grant configuration component 1614 selects an UL/DL grant configuration based on a TDD subframe configuration via 1664 and 1668. In such an aspect, the UL/DL grant configuration includes sending DL grants on the secondary carrier and UL grants on the primary carrier when the TDD subframe configuration includes more UL subframes than DL subframes, and the UL/DL grant configuration includes sending DL grants on the secondary carrier and UL grants on the secondary carrier when the TDD subframe configuration includes more UL subframes than DL subframes. In an aspect, a scheduling mode is configured independently for each of available carriers including the primary carrier and the secondary carrier. In an aspect, the scheduling mode is configured based on at least one of interference or channel availability in each of the available carriers. In an aspect, a scheduling mode is configured independently for each of available carriers including the primary carrier and the secondary carrier, and independently for the UL grant and the DL grant.

The resource management component 1616 sends at 1670 and 1654 via the transmission component 1606 configuration information adjusting a number of resources the UE is to monitor for the UL grant. The resource management component 1616 configures (e.g., via 1672) a number of candidates or aggregation levels to monitor in a PDCCH. The resource management component 1616 configures (e.g., via 1672) at least one of a number of sets of EPDCCHs, a number of RBs for each set of EPDCCHs, a type of EPDCCH, or a number of candidates or aggregation levels for EPDCCH monitoring. In an aspect, the number of resources to monitor depends on at least one of a TDD subframe configuration or a number of active unlicensed carriers.

The apparatus may include additional components that perform each of the blocks of the algorithm in the aforementioned flowcharts of FIGS. 13-15. As such, each block in the aforementioned flowcharts of FIGS. 13-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
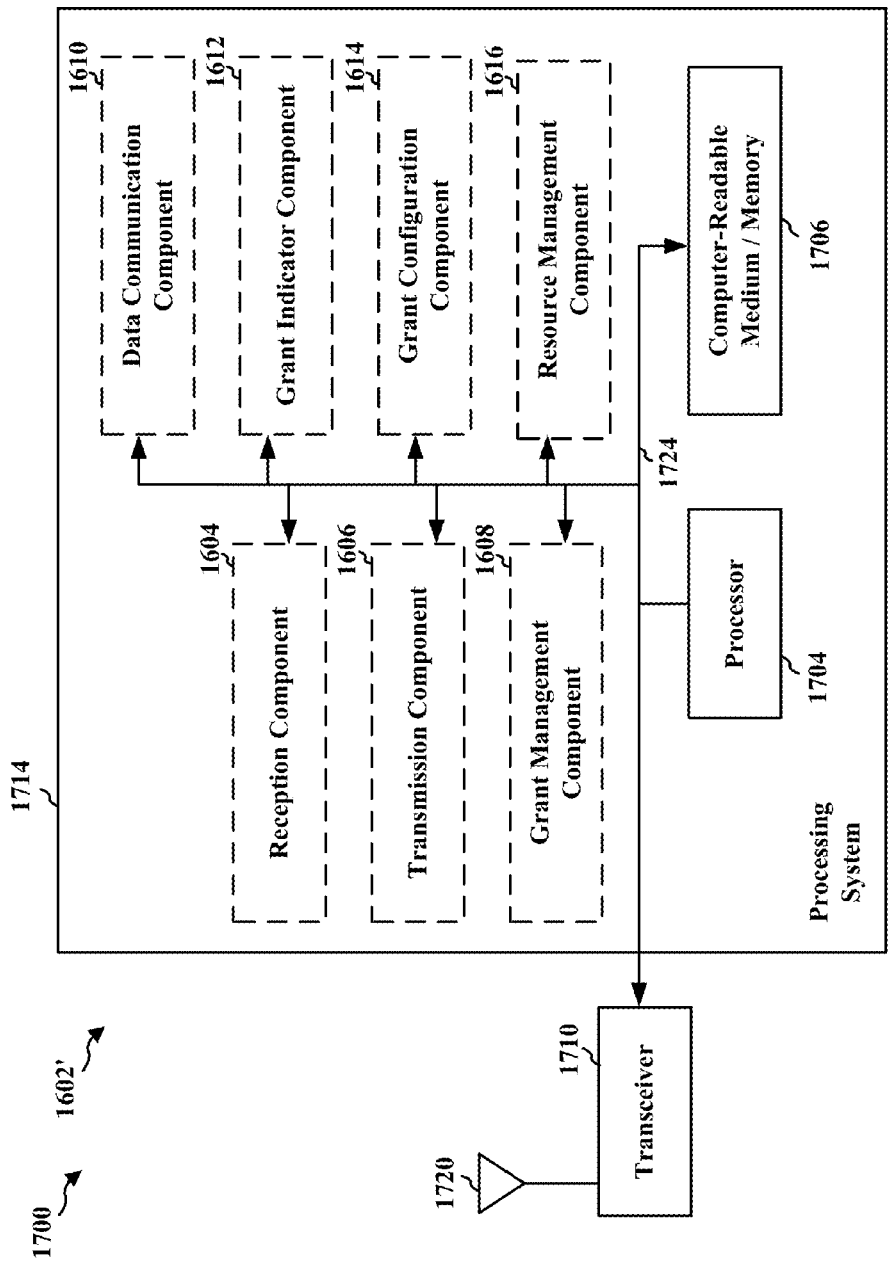
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1608, 1610, 1612, 1614, 1616, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1606, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system 1714 further includes at least one of the components 1604, 1606, 1608, 1610, 1612, 1614, 1616. The components may be software components running in the processor 1704, resident/stored in the computer readable medium/memory 1706, one or more hardware components coupled to the processor 1704, or some combination thereof. The processing system 1714 may be a component of the eNB 310 and may include the memory 376 and/or at least one of the TX processor 316, the RX processor 370, and the controller/processor 375.

In one configuration, the apparatus 1602/1602' for wireless communication includes means for sending a DL grant for a secondary carrier and a UL grant for the secondary carrier, where the DL grant is transmitted on the secondary carrier and the UL grant is transmitted on a primary carrier, means for sending DL data on the secondary carrier after sending the DL grant on the secondary carrier, and means for receiving UL data on the secondary carrier after sending the UL grant on the primary carrier. The apparatus 1602/1602' further includes means for sending information about a set of DCI formats or DCI format sizes to monitor on each subframe on each carrier. The apparatus 1602/1602' further includes means for sending configuration information, indicating a maximum number of blind decodes to be performed at the UE per subframe to detect at least one of the DL grant or the UL grant. The apparatus 1602/1602' further includes means for sending, on the primary carrier, a DL grant indicator, where the DL grant indicator indicates whether the UE should monitor at least one of the primary carrier or the secondary carrier for the DL grant. The apparatus 1602/1602' further includes means for selecting an UL/DL grant configuration based on a TDD subframe configuration. The apparatus 1602/1602' further includes means for sending configuration information adjusting a number of resources the UE is to monitor for the UL grant. The apparatus 1602/1602' further includes means for configuring a number of candidates or aggregation levels to monitor in a PDCCH, and means for configuring at least one of a number of sets of EPDCCHs, a number of RBs for each set of EPDCCHs, a type of EPDCCH, or a number of candidates or aggregation levels for EPDCCH monitoring.

The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication by a user equipment (UE), comprising:
receiving, from a base station, a downlink (DL) grant for a secondary carrier and an uplink (UL) grant for the secondary carrier, wherein the DL grant is received on the secondary carrier and the UL grant is received on a primary carrier, wherein the DL grant and the UL grant are received using a configuration where DL grants are scheduled by self-scheduling on the secondary carrier and UL grants are scheduled by cross-carrier scheduling on the primary carrier;
receiving DL data on the secondary carrier after receiving the DL grant on the secondary carrier; and
transmitting UL data on the secondary carrier after receiving the UL grant on the primary carrier,
wherein the primary carrier is a different carrier than the secondary carrier.

2. The method of claim 1, wherein the primary carrier is a licensed carrier and the secondary carrier is an unlicensed carrier.

3. The method of claim 1, further comprising:
receiving information about at least one of a set of downlink control information (DCI) formats or DCI format sizes of respective DCI messages to monitor on each subframe on each carrier; and
monitoring for at least one of the UL grant or the DL grant based on the information.

4. The method of claim 3, wherein each of the DCI format sizes of the respective DCI messages is specific to a transmission mode.

5. The method of claim 1, further comprising:
receiving information on a number of blind decodes to perform per subframe; and
blind decoding based on the number of blind decodes to detect at least one of the DL grant or the UL grant.

6. The method of claim 1, wherein the UL grant received on the primary carrier corresponds to a plurality of unlicensed carriers, and further comprising:
selecting a carrier from among the plurality of unlicensed carriers as the secondary carrier to transmit the UL data.

7. The method of claim 6, wherein the selecting the carrier from among the plurality of unlicensed carriers comprises:
determining channel availability of channels associated with the plurality of unlicensed carriers, wherein a channel is available when an energy of the channel is lower than an energy threshold; and
selecting the carrier associated with the channel for transmission of the UL data based on at least one of the channel availability or a carrier priority.

8. The method of claim 1, further comprising:
receiving configuration information from a serving base station adjusting a number of resource blocks to monitor for receiving the UL grant; and
monitoring for the UL grant based on the received configuration information adjusting the number of resource blocks to monitor for receiving the UL grant.

9. A method for wireless communication by a base station, comprising:
sending a downlink (DL) grant for a secondary carrier and an uplink (UL) grant for the secondary carrier, wherein the DL grant is transmitted on the secondary carrier and the UL grant is transmitted on a primary carrier, wherein the DL grant and the UL grant are transmitted from the base station using a configuration where DL grants are scheduled by self-scheduling on the secondary carrier and UL grants are scheduled by cross-carrier scheduling on the primary carrier;
sending DL data on the secondary carrier after sending the DL grant on the secondary carrier; and
receiving UL data on the secondary carrier after sending the UL grant on the primary carrier,
wherein the primary carrier is a different carrier than the secondary carrier.

10. The method of claim 9, wherein the primary carrier is a licensed carrier, and the secondary carrier is an unlicensed carrier.

11. The method of claim 9, further comprising:
sending information about a set of downlink control information (DCI) formats or DCI format sizes to monitor on each subframe on each carrier.

12. The method of claim 11, wherein each of the DCI format sizes is specific to a transmission mode.

13. The method of claim 9, further comprising:
sending configuration information, indicating a maximum number of blind decodes to be performed at a user equipment (UE) per subframe to detect at least one of the DL grant or the UL grant.

14. The method of claim 9, further comprising selecting grant the configuration based on a time division duplex (TDD) UL/DL subframe configuration.

15. The method of claim 14, wherein the configuration corresponds to a first configuration used when the TDD UL/DL subframe configuration includes more UL subframes than DL subframes, and the method further comprises:
using a second configuration that includes sending DL grants on the secondary carrier and UL grants on the secondary carrier when the TDD UL/DL subframe configuration includes more DL subframes than UL subframes.

16. The method of claim 9, wherein a scheduling mode is configured independently for each of available carriers including the primary carrier and the secondary carrier.

17. The method of claim 16, wherein the scheduling mode is configured based on at least one of interference or channel availability in each of the available carriers.

18. The method of claim 9, wherein a scheduling mode is configured independently for each of available carriers including the primary carrier and the secondary carrier, and independently for the UL grant and the DL grant.

19. The method of claim 9, wherein the secondary carrier to receive the UL data is a carrier selected among a plurality of unlicensed carriers, and wherein the UL grant sent on the primary carrier is specified for the plurality of unlicensed carriers.

20. The method of claim 19, wherein the base station is configured to blindly detect the selected carrier.

21. The method of claim 9, further comprising:
sending configuration information adjusting a number of resources the UE is to monitor for the UL grant.

22. The method of claim 21, further comprising:
configuring a number of candidates or aggregation levels to monitor in a physical downlink control channel (PDCCH);
configuring at least one of a number of sets of enhanced PDCCHs (EPDCCHs), a number of resource blocks (RBs) for each set of EPDCCHs, a type of EPDCCH, or a number of candidates or aggregation levels for EPDCCH monitoring.

23. The method of claim 21, wherein the number of resources to monitor depends on at least one of a time division duplex (TDD) subframe configuration or a number of active unlicensed carriers.

24. A user equipment (UE) for wireless communication, comprising:
means for receiving, from a base station, a downlink (DL) grant for a secondary carrier and an uplink (UL) grant for the secondary carrier, wherein the DL grant is received on the secondary carrier and the UL grant is received on a primary carrier, wherein the DL grant and the UL grant are received using a configuration where DL grants are scheduled by self-scheduling on the secondary carrier and UL grants are scheduled by cross-carrier scheduling on the primary carrier;
means for receiving DL data on the secondary carrier after receiving the DL grant on the secondary carrier; and
means for transmitting UL data on the secondary carrier after receiving the UL grant on the primary carrier,
wherein the primary carrier is a different carrier than the secondary carrier.

25. The UE of claim 24, wherein the primary carrier is a licensed carrier and the secondary carrier is an unlicensed carrier.

26. The UE of claim 24, further comprising:
means for receiving information about at least one of a set of downlink control information (DCI) formats or DCI format sizes of respective DCI messages to monitor on each subframe on each carrier; and
means for monitoring for at least one of the UL grant or the DL grant based on the information.

27. The UE of claim 26, wherein each of the DCI format sizes of the respective DCI messages is specific to a transmission mode.

28. The UE of claim 24, further comprising:
means for receiving information on a number of blind decodes to perform per subframe; and
means for blind decoding based on the number of blind decodes to detect at least one of the DL grant or the UL grant.

29. The UE of claim 24, wherein the UL grant received on the primary carrier corresponds to a plurality of unlicensed carriers, and further comprising:
means for selecting a carrier from among the plurality of unlicensed carriers as the secondary carrier to transmit the UL data.

30. The UE of claim 29, wherein the means for selecting the carrier from among the plurality of unlicensed carriers is configured to:
determine channel availability of channels associated with the plurality of unlicensed carriers, wherein a channel is available when an energy of the channel is lower than an energy threshold; and
select the carrier associated with the channel for transmission of the UL data based on at least one of the channel availability or a carrier priority.

31. The UE of claim 24, further comprising:
means for receiving configuration information from a serving base station adjusting a number of resource blocks to monitor for receiving the UL grant; and
means for monitoring for the UL grant based on the received configuration information adjusting the number of resource blocks to monitor for receiving the UL grant.

32. A base station for wireless communication, comprising:
means for sending a downlink (DL) grant for a secondary carrier and an uplink (UL) grant for the secondary carrier, wherein the DL grant is transmitted on the secondary carrier and the UL grant is transmitted on a primary carrier, wherein the DL grant and the UL grant are transmitted from the base station using a configuration where DL grants are scheduled by self-scheduling on the secondary carrier and UL grants are scheduled by cross-carrier scheduling on the primary carrier;
means for sending DL data on the secondary carrier after sending the DL grant on the secondary carrier; and
means for receiving UL data on the secondary carrier after sending the UL grant on the primary carrier,
wherein the primary carrier is a different carrier than the secondary carrier.

33. The base station of claim 32, wherein the primary carrier is a licensed carrier, and the secondary carrier is an unlicensed carrier.

34. The base station of claim 32, further comprising:
means for sending information about a set of downlink control information (DCI) formats or DCI format sizes to monitor on each subframe on each carrier.

35. The base station of claim 34, wherein each of the DCI format sizes is specific to a transmission mode.

36. The base station of claim 32, further comprising:
means for sending configuration information, indicating a maximum number of blind decodes to be performed at a user equipment (UE) per subframe to detect at least one of the DL grant or the UL grant.

37. The base station of claim 32, further comprising:
means for selecting the configuration based on a time division duplex (TDD) UL/DL subframe configuration.

38. The base station of claim 37, wherein the configuration corresponds to a first configuration used when the TDD UL/DL subframe configuration includes more UL subframes than DL subframes, and the base station further comprises
means for using a second configuration that includes sending DL grants on the secondary carrier and UL grants on the secondary carrier when the TDD UL/DL subframe configuration includes more DL subframes than UL subframes.

39. The base station of claim 32, wherein a scheduling mode is configured independently for each of available carriers including the primary carrier and the secondary carrier.

40. The base station of claim 39, wherein the scheduling mode is configured based on at least one of interference or channel availability in each of the available carriers.

41. The base station of claim 32, wherein a scheduling mode is configured independently for each of available carriers including the primary carrier and the secondary carrier, and independently for the UL grant and the DL grant.

42. The base station of claim 32, wherein the secondary carrier to receive the UL data is a carrier selected among a plurality of unlicensed carriers, and
wherein the UL grant sent on the primary carrier is specified for the plurality of unlicensed carriers.

43. The base station of claim 42, wherein the base station is configured to blindly detect the selected carrier.

44. The base station of claim 32, further comprising:
means for sending configuration information adjusting a number of resources the UE is to monitor for the UL grant.

45. The base station of claim 44, further comprising:
means for configuring a number of candidates or aggregation levels to monitor in a physical downlink control channel (PDCCH);
means for configuring at least one of a number of sets of enhanced PDCCHs (EPDCCHs), a number of resource blocks (RBs) for each set of EPDCCHs, a type of EPDCCH, or a number of candidates or aggregation levels for EPDCCH monitoring.

46. The base station of claim 44, wherein the number of resources to monitor depends on at least one of a time division duplex (TDD) subframe configuration or a number of active unlicensed carriers.

47. A user equipment (UE) for wireless communication, comprising:
a memory; and
at least one processor coupled to the memory and configured to:
receive, from a base station, a downlink (DL) grant for a secondary carrier and an uplink (UL) grant for the secondary carrier, wherein the DL grant is received on the secondary carrier and the UL grant is received on a primary carrier, wherein the DL grant and the UL grant are received using a configuration where DL grants are scheduled by self-scheduling on the secondary carrier and UL grants are scheduled by cross-carrier scheduling on the primary carrier;
receive DL data on the secondary carrier after receiving the DL grant on the secondary carrier; and
transmit UL data on the secondary carrier after receiving the UL grant on the primary carrier,
wherein the primary carrier is a different carrier than the secondary carrier.

48. The UE of claim 47, wherein the primary carrier is a licensed carrier and the secondary carrier is an unlicensed carrier.

49. The UE of claim 47, wherein the at least one processor is further configured to:
receive information about at least one of a set of downlink control information (DCI) formats or DCI format sizes of respective DCI messages to monitor on each subframe on each carrier; and
monitor for at least one of the UL grant or the DL grant based on the information.

50. The UE of claim 49, wherein each of the DCI format sizes of the respective DCI messages is specific to a transmission mode.

51. The UE of claim 47, wherein the at least one processor is further configured to:
receive information on a number of blind decodes to perform per subframe; and
blind decode based on the number of blind decodes to detect at least one of the DL grant or the UL grant.

52. The UE of claim 47, wherein the UL grant received on the primary carrier corresponds to a plurality of unlicensed carriers, and the at least one processor is further configured to:
select a carrier from among the plurality of unlicensed carriers as the secondary carrier to transmit the UL data.

53. The UE of claim 52, wherein the at least one processor configured to select the carrier from among the plurality of unlicensed carriers is configured to:
determine channel availability of channels associated with the plurality of unlicensed carriers, wherein a channel is available when an energy of the channel is lower than an energy threshold; and
select the carrier associated with the channel for transmission of the UL data based on at least one of the channel availability or a carrier priority.

54. The UE of claim 47, wherein the at least one processor is further configured to:
receive configuration information from a serving base station adjusting a number of resource blocks to monitor for receiving the UL grant; and
monitor for the UL grant based on the received configuration information adjusting the number of resource blocks to monitor for receiving the UL grant.

55. A base station for wireless communication, comprising:
a memory; and
at least one processor coupled to the memory and configured to:
send a downlink (DL) grant for a secondary carrier and an uplink (UL) grant for the secondary carrier, wherein the DL grant is transmitted on the secondary carrier and the UL grant is transmitted on a primary carrier, wherein the DL grant and the UL grant are transmitted from the base station using a configuration where DL grants are scheduled by self-scheduling on the secondary carrier and UL grants are scheduled by cross-carrier scheduling on the primary carrier;
send DL data on the secondary carrier after sending the DL grant on the secondary carrier; and
receive UL data on the secondary carrier after sending the UL grant on the primary carrier,
wherein the primary carrier is a different carrier than the secondary carrier.

56. The base station of claim 55, wherein the primary carrier is a licensed carrier, and the secondary carrier is an unlicensed carrier.

57. The base station of claim 55, wherein the at least one processor is further configured to:
send information about a set of downlink control information (DCI) formats or DCI format sizes to monitor on each subframe on each carrier.

58. The base station of claim 57, wherein each of the DCI format sizes is specific to a transmission mode.

59. The base station of claim 55, wherein the at least one processor is further configured to:
send configuration information, indicating a maximum number of blind decodes to be performed at a user equipment (UE) per subframe to detect at least one of the DL grant or the UL grant.

60. The base station of claim 55, wherein the at least one processor is further configured to:

select the configuration based on a time division duplex (TDD) UL/DL subframe configuration.

61. The base station of claim 60, wherein the configuration corresponds to a first configuration used when the TDD UL/DL subframe configuration includes more UL subframes than DL subframes, and the at least one processor is further configured to:
use a second configuration that includes sending DL grants on the secondary carrier and UL grants on the secondary carrier when the TDD UL/DL subframe configuration includes more DL subframes than UL subframes.

62. The base station of claim 55, wherein a scheduling mode is configured independently for each of available carriers including the primary carrier and the secondary carrier.

63. The base station of claim 62, wherein the scheduling mode is configured based on at least one of interference or channel availability in each of the available carriers.

64. The base station of claim 55, wherein a scheduling mode is configured independently for each of available carriers including the primary carrier and the secondary carrier, and independently for the UL grant and the DL grant.

65. The base station of claim 55, wherein the secondary carrier to receive the UL data is a carrier selected among a plurality of unlicensed carriers, and
wherein the UL grant sent on the primary carrier is specified for the plurality of unlicensed carriers.

66. The base station of claim 65, wherein the base station is configured to blindly detect the selected carrier.

67. The base station of claim 55, wherein the at least one processor is further configured to:
send configuration information adjusting a number of resources the UE is to monitor for the UL grant.

68. The base station of claim 67, wherein the at least one processor is further configured to:
configure a number of candidates or aggregation levels to monitor in a physical downlink control channel (PDCCH);
configure at least one of a number of sets of enhanced PDCCHs (EPDCCHs), a number of resource blocks (RBs) for each set of EPDCCHs, a type of EPDCCH, or a number of candidates or aggregation levels for EPDCCH monitoring.

69. The base station of claim 67, wherein the number of resources to monitor depends on at least one of a time division duplex (TDD) subframe configuration or a number of active unlicensed carriers.

70. A computer-readable medium storing computer executable code for wireless communication by a user equipment (UE), comprising code to:
receive, from a base station, a downlink (DL) grant for a secondary carrier and an uplink (UL) grant for the secondary carrier, wherein the DL grant is received on the secondary carrier and the UL grant is received on a primary carrier, wherein the DL grant and the UL grant are received using a configuration where DL grants are scheduled by self-scheduling on the secondary carrier and UL grants are scheduled by cross-carrier scheduling on the primary carrier;
receive DL data on the secondary carrier after receiving the DL grant on the secondary carrier; and
transmit UL data on the secondary carrier after receiving the UL grant on the primary carrier,
wherein the primary carrier is a different carrier than the secondary carrier.

71. The computer-readable medium of claim 70, wherein the primary carrier is a licensed carrier and the secondary carrier is an unlicensed carrier.

72. The computer-readable medium of claim 70, further comprising code to:
receive information about at least one of a set of downlink control information (DCI) formats or DCI format sizes of respective DCI messages to monitor on each subframe on each carrier; and
monitor for at least one of the UL grant or the DL grant based on the information.

73. The computer-readable medium of claim 72, wherein each of the DCI format sizes of the respective DCI messages is specific to a transmission mode.

74. The computer-readable medium of claim 70, further comprising code to:
receive information on a number of blind decodes to perform per subframe; and
blind decode based on the number of blind decodes to detect at least one of the DL grant or the UL grant.

75. The computer-readable medium of claim 70, wherein the UL grant received on the primary carrier corresponds to a plurality of unlicensed carriers, further comprising code to:
select a carrier from among the plurality of unlicensed carriers as the secondary carrier to transmit the UL data.

76. The computer-readable medium of claim 75, wherein the code to select the carrier from among the plurality of unlicensed carriers comprises code to:
determine channel availability of channels associated with the plurality of unlicensed carriers, wherein a channel is available when an energy of the channel is lower than an energy threshold; and
select the carrier associated with the channel for transmission of the UL data based on at least one of the channel availability or a carrier priority.

77. The computer-readable medium of claim 70, further comprising code to:
receive configuration information from a serving base station adjusting a number of resource blocks to monitor for receiving the UL grant; and
monitor for the UL grant based on the received configuration information adjusting the number of resource blocks to monitor for receiving the UL grant.

78. A computer-readable medium storing computer executable code for wireless communication by a base station, comprising code to:
send a downlink (DL) grant for a secondary carrier and an uplink (UL) grant for the secondary carrier, wherein the DL grant is transmitted on the secondary carrier and the UL grant is transmitted on a primary carrier, wherein the DL grant and the UL grant are transmitted from the base station using a configuration where DL grants are scheduled by self-scheduling on the secondary carrier and UL grants are scheduled by cross-carrier scheduling on the primary carrier;
send DL data on the secondary carrier after sending the DL grant on the secondary carrier; and
receive UL data on the secondary carrier after sending the UL grant on the primary carrier,
wherein the primary carrier is a different carrier than the secondary carrier.

79. The computer-readable medium of claim 78, wherein the primary carrier is a licensed carrier, and the secondary carrier is an unlicensed carrier.

80. The computer-readable medium of claim 78, further comprising code to:

send information about a set of downlink control information (DCI) formats or DCI format sizes to monitor on each subframe on each carrier.

81. The computer-readable medium of claim 80, wherein each of the DCI format sizes is specific to a transmission mode.

82. The computer-readable medium of claim 78, further comprising code to:
send configuration information, indicating a maximum number of blind decodes to be performed at a user equipment (UE) per subframe to detect at least one of the DL grant or the UL grant.

83. The computer-readable medium of claim 78, further comprising code to select the configuration based on a time division duplex (TDD) UL/DL subframe configuration.

84. The computer-readable medium of claim 83, wherein the configuration corresponds to a first configuration used when the TDD UL/DL subframe configuration includes more UL subframes than DL subframes, and the computer-readable medium further comprises code to
use a second configuration that includes sending DL grants on the secondary carrier and UL grants on the secondary carrier when the TDD UL/DL subframe configuration includes more DL subframes than UL subframes.

85. The computer-readable medium of claim 78, wherein a scheduling mode is configured independently for each of available carriers including the primary carrier and the secondary carrier.

86. The computer-readable medium of claim 85, wherein the scheduling mode is configured based on at least one of interference or channel availability in each of the available carriers.

87. The computer-readable medium of claim 78, wherein a scheduling mode is configured independently for each of available carriers including the primary carrier and the secondary carrier, and independently for the UL grant and the DL grant.

88. The computer-readable medium of claim 78, wherein the secondary carrier to receive the UL data is a carrier selected among a plurality of unlicensed carriers, and
wherein the UL grant sent on the primary carrier is specified for the plurality of unlicensed carriers.

89. The computer-readable medium of claim 88, wherein the base station is configured to blindly detect the selected carrier.

90. The computer-readable medium of claim 78, further comprising code to:
send configuration information adjusting a number of resources the UE is to monitor for the UL grant.

91. The computer-readable medium of claim 90, further comprising code to:
configure a number of candidates or aggregation levels to monitor in a physical downlink control channel (PDCCH);
configure at least one of a number of sets of enhanced PDCCHs (EPDCCHs), a number of resource blocks (RBs) for each set of EPDCCHs, a type of EPDCCH, or a number of candidates or aggregation levels for EPDCCH monitoring.

92. The computer-readable medium of claim 90, wherein the number of resources to monitor depends on at least one of a time division duplex (TDD) subframe configuration or a number of active unlicensed carriers.

* * * * *